(12) United States Patent
Hoch et al.

(10) Patent No.: US 10,969,916 B2
(45) Date of Patent: Apr. 6, 2021

(54) SINGLE-LAYER CAPACITIVE IMAGE SENSOR

(71) Applicant: Synaptics Incorporated, San Jose, CA (US)

(72) Inventors: David Hoch, Hickory, NC (US); Adam L. Schwartz, Redwood City, CA (US); Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/580,531

(22) Filed: Sep. 24, 2019

(65) Prior Publication Data

US 2020/0110510 A1    Apr. 9, 2020

Related U.S. Application Data

(60) Provisional application No. 62/741,485, filed on Oct. 4, 2018.

(51) Int. Cl.
*G06F 3/044* (2006.01)
(52) U.S. Cl.
CPC .......... *G06F 3/0443* (2019.05); *G06F 3/0446* (2019.05)

(58) Field of Classification Search
CPC ...... G06F 3/0443; G06F 3/0446; G06F 3/044; G06F 3/0416; G06F 3/0412
See application file for complete search history.

(56) References Cited

U.S. PATENT DOCUMENTS

| | | | | |
|---|---|---|---|---|
| 2012/0262414 A1* | 10/2012 | Lai | ........................ | G06F 3/0443 345/174 |
| 2012/0319966 A1* | 12/2012 | Reynolds | .............. | G06F 3/0446 345/173 |
| 2013/0181942 A1* | 7/2013 | Bulea | .................... | G06F 3/0443 345/174 |

* cited by examiner

*Primary Examiner* — Carolyn R Edwards
(74) *Attorney, Agent, or Firm* — Paradice & Li LLP

(57) ABSTRACT

A capacitive sensing array includes a first transmitter electrode, a plurality of first receiver electrodes, a second transmitter electrode, and a plurality of second receiver electrodes disposed in a first row of the array. The first transmitter electrode is disposed in a first column of the array and is coupled to a first transmitter channel. The first receiver electrodes are disposed in a second column of the array, adjacent the first transmitter electrode, and are coupled to a respective one of a plurality of first receiver channels. The second transmitter electrode is disposed in a third column of the array and is coupled to a second transmitter channel. The second receiver electrodes are disposed in a fourth column of the array, adjacent the second transmitter electrode, and are coupled to a respective one of the first receiver channels.

17 Claims, 16 Drawing Sheets

SINGLE-LAYER CAPACITIVE IMAGE SENSOR

CROSS-REFERENCE TO RELATED APPLICATION

This application claims priority and benefit under 35 USC § 119(e) to U.S. Provisional Patent Application No. 62/741,485, filed on Oct. 4, 2018, which is incorporated herein by reference in its entirety.

TECHNICAL FIELD

The present embodiments relate generally to capacitive sensing, and specifically to measuring a resistance between sensor electrodes.

BACKGROUND OF RELATED ART

Input devices including proximity sensor devices are widely used in a variety of electronic systems. A proximity sensor device may include a sensing region, often demarked by an input surface, in which the proximity sensor device determines the presence, location, force, and/or motion of one or more input objects. Proximity sensor devices may be used to provide interfaces for the electronic system. For example, proximity sensor devices may be used as input devices for larger computing systems (such as opaque touchpads integrated in, or peripheral to, notebook or desktop computers). Proximity sensor devices may also be used in smaller computing systems, such as touch screens integrated in cellular phones.

Proximity sensors may operate by detecting changes in an electric field and/or capacitance in the sensing region. For example, the sensing region may include a number of conductors that can be configured to transmit and/or receive an electric signal. The signal can then be used to measure a capacitive coupling between various pairs of conductors. A "baseline" represents the expected capacitance for a pair of conductors when no external objects are present in the sensing region. Objects in contact with (or close proximity to) the sensing region may alter the effective capacitance of the conductors (e.g., from the baseline). Thus, a detected change in capacitance across one or more pairs of conductors may signal the presence and/or position of an object in the sensing region.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

An array of sensor electrodes is disclosed with localized groups of transmitter electrodes and reused receiver channels in each row. One innovative aspect of the subject matter of this disclosure can be implemented in a capacitive sensing array including a first transmitter electrode, a plurality of first receiver electrodes, a second transmitter electrode, and a plurality of second receiver electrodes disposed in a first row of the capacitive sensor array. The first transmitter electrode is disposed in a first column of the capacitive sensor array and is coupled to a first transmitter channel. The first receiver electrodes are disposed in a second column of the capacitive sensor array, adjacent the first transmitter electrode, and are coupled to a respective one of a plurality of first receiver channels. The second transmitter electrode is disposed in a third column of the capacitive sensor array and is coupled to a second transmitter channel. The second receiver electrodes are disposed in a fourth column of the capacitive sensor array, adjacent the second transmitter electrode, and are coupled to a respective one of the first receiver channels.

Another innovative aspect of the subject matter of this disclosure can be implemented in a method of capacitive sensing. The method may include steps of activating a first transmitter channel coupled to a first transmitter electrode, where the first transmitter electrode is disposed in a first row and a first column of a capacitive sensing array; sensing a capacitive coupling between the first transmitter electrode and a plurality of first receiver electrodes adjacent the first transmitter electrode when the first transmitter channel is activated, where the first receiver electrodes are disposed in the first row and a second column of the capacitive sensor array; activating a second transmitter channel coupled to a second transmitter electrode, where the second transmitter electrode is disposed in the first row and a third column of the capacitive sensor array; and sensing a capacitive coupling between the second transmitter electrode and a plurality of second receiver electrodes adjacent the second transmitter electrode when the second transmitter channel is activated, where the second receiver electrodes are disposed in the first row and a fourth column of the capacitive sensor array.

BRIEF DESCRIPTION OF THE DRAWINGS

The present embodiments are illustrated by way of example and are not intended to be limited by the figures of the accompanying drawings.

DETAILED DESCRIPTION

Figure 1:
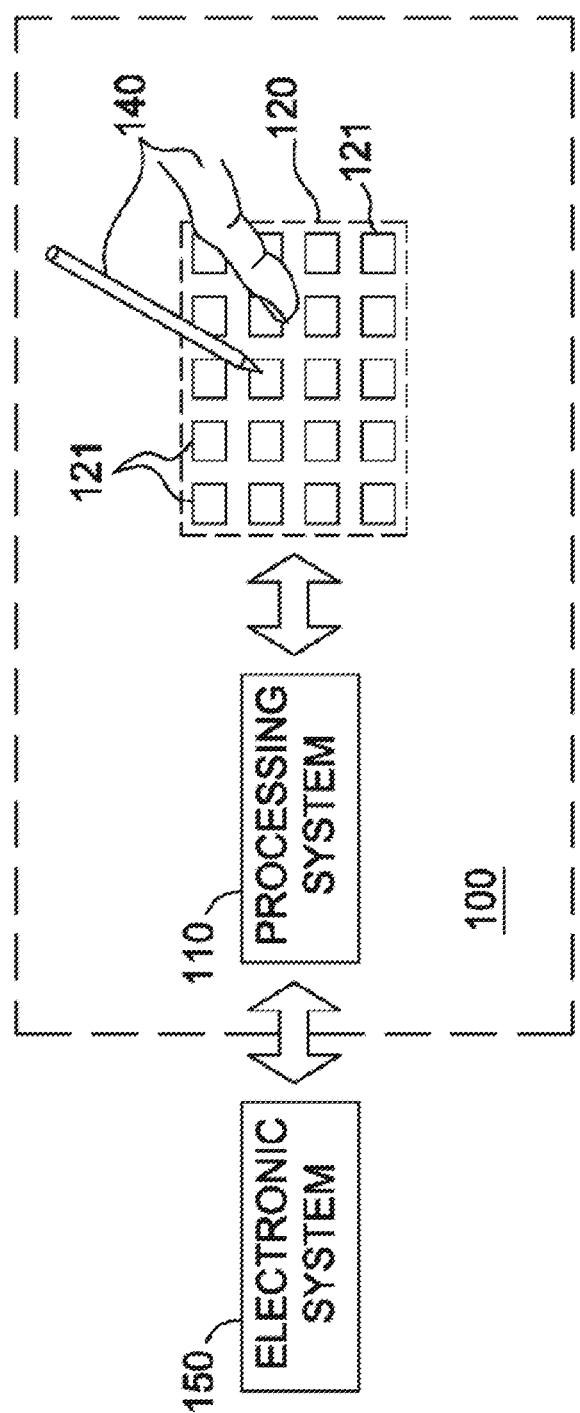
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, special purpose processor, and/or state machine capable of executing scripts or instructions of one or more software programs stored in memory.

FIG. 1 shows an example input device 100 within which the present embodiments may be implemented. The input device 100 includes a processing system 110 and a sensing region 120. The input device 100 may be configured to provide input to an electronic system 150. Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system 150. Alternatively, the input device 100 may be physically separated from the electronic system 150. The input device 100 may be coupled to (and communicate with) components of the electronic system 150 using various wired and/or wireless interconnection and communication technologies, such as buses and networks. Examples technologies may include Inter-Integrated Circuit ($I^2C$), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device configured to sense input provided by one or more input objects 140 in the sensing region 120. Example proximity sensor devices may include touchpads, touch screens, touch sensor devices, and the like. Example input objects 140 may include fingers, styli, and the like. The sensing region 120 may encompass any space above, around, in, and/or proximate to the input device 100 in which the input device 100 is able to detect user input, such as provided by one or more input objects 140. The size, shape, and/or location of the sensing region 120, relative to the electronic system 150, may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region 120 may include one or more capacitive sensing elements 121 (e.g., sensor electrodes) to create an electric field. The input device 100 may detect inputs based on changes in capacitance of the sensing elements 121. For example, an object in contact with (or close proximity to) the electric field may cause changes in the voltage and/or current in the sensing elements 121. Such changes in voltage and/or current may be detected as "signals" indicative of user input. The sensing elements 121 may be arranged in arrays or other configurations to detect inputs at multiple points within the sensing region 120. In some aspects, some sensing elements 121 may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between one or more of the sensing elements 121 and an input object. For example, an input object near one or more of the sensing elements 121 may alter the electric field near the sensing elements 121, thus changing the measured capacitive coupling between two or more sensor electrodes of the sensing elements 121. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. The change in capacitive coupling may be between sensor electrodes in two different sensing elements 121 or between two different sensor electrodes in the same sensing element 121. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

In some embodiments, the input device 100 may further detect a force exerted on an input surface coinciding with the sensing region 120. For example, the input device 100 may include one or more force sensors configured to generate force information representative of the force exerted by the input object 140 when making contact with the sensing region 120. In some aspects, the force information may be in the form of electrical signals representative of an amplitude (or change in amplitude) of the force applied to the input surface. For example, the force sensors may be formed, at least in part, by conductors provided on an underside of the input surface and a structure (such as a midframe) underlying the input surface. More specifically, the input surface may be configured to move (e.g., deflect and/or compress) relative to the underlying structure when a force is applied the input object 140. The force sensors may produce electrical signals based on a change in capacitance, between the conductors, when the input surface moves relative to the underlying structure.

The processing system 110 may be configured to operate the hardware of the input device 100 to detect input in the sensing region 120. In some embodiments, the processing system 110 may control one or more sensor electrodes and/or force sensors to detect objects in the sensing region 120. For example, the processing system 110 may be configured to transmit signals via one or more transmitter sensor electrodes and receive signals via one or more receiver sensor electrodes. The processing system 110 may also be configured to receive force information via one or more force sensors. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system 150.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system 150 (e.g., to a CPU of the electronic system). The electronic system 150 may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system 150. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. In some embodiments, the processing system 110 may further determine positional information and/or force information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system 150. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

In some configuration, the sensing elements 121 may be coupled to the processing system 110 via a plurality of traces. A trace is an electronic component that connects an electrode region within a sensor electrode (e.g., sensing element 121) to the controlling electronics found in the proximity sensor device (e.g., the processing system 110). It is noted that the cost and size limitations placed on the input device 100 are often created by the number of traces, the number of connection points, the connection component's complexity (e.g., number of pins on a connector) and the complexity of the flexible components used to interconnect the sensing elements 121 to the processing system 110.

During the operation of the input device 110, the presence of an input object over the sensing region 120 will interfere with the signal provided by the driven sensing elements 121 (e.g., transmitter electrodes) and also their respective traces (e.g., transmitter traces). However, the coupling between the transmitter electrodes and the receiver electrodes is also affected by the interaction between the transmitter traces and the receiver electrodes. Thus, the interaction of an input object and the signal carried on the traces will cause an unwanted parasitic response. The parasitic response may cause the processing system 110 to incorrectly determine that one or more phantom input objects are interacting with the sensing region 120 (e.g., resulting in one or more ghost touches). Moreover, the greater the length of the traces used to interconnect the sensor electrodes to the computer system, the more susceptible the input device 100 is to interference, such as electromagnetic interference (EMI), and the more susceptible the input device 100 is to a parasitic response. The parasitic response and interference provided by these supporting components will adversely affect the reliability and accuracy of the data collected by the input device 100.

Aspects of the present disclosure enable 2-D capacitance images to be created using a single sensing layer in which the transmitting and receiving sensor electrodes are coplanar with one another (e.g., without the use of jumpers within the sensing region 120). The reduced number of layers used to form the input device described herein versus other conventional position sensing devices also equates to fewer production steps, which will reduce the production cost of the device. The reduction in the layers of the input device also decreases interference or obscuration of an image or display that is viewed through the sensor, thus lending itself to improved optical quality of the formed input device when it is integrated with a display device.

Figure 2A:
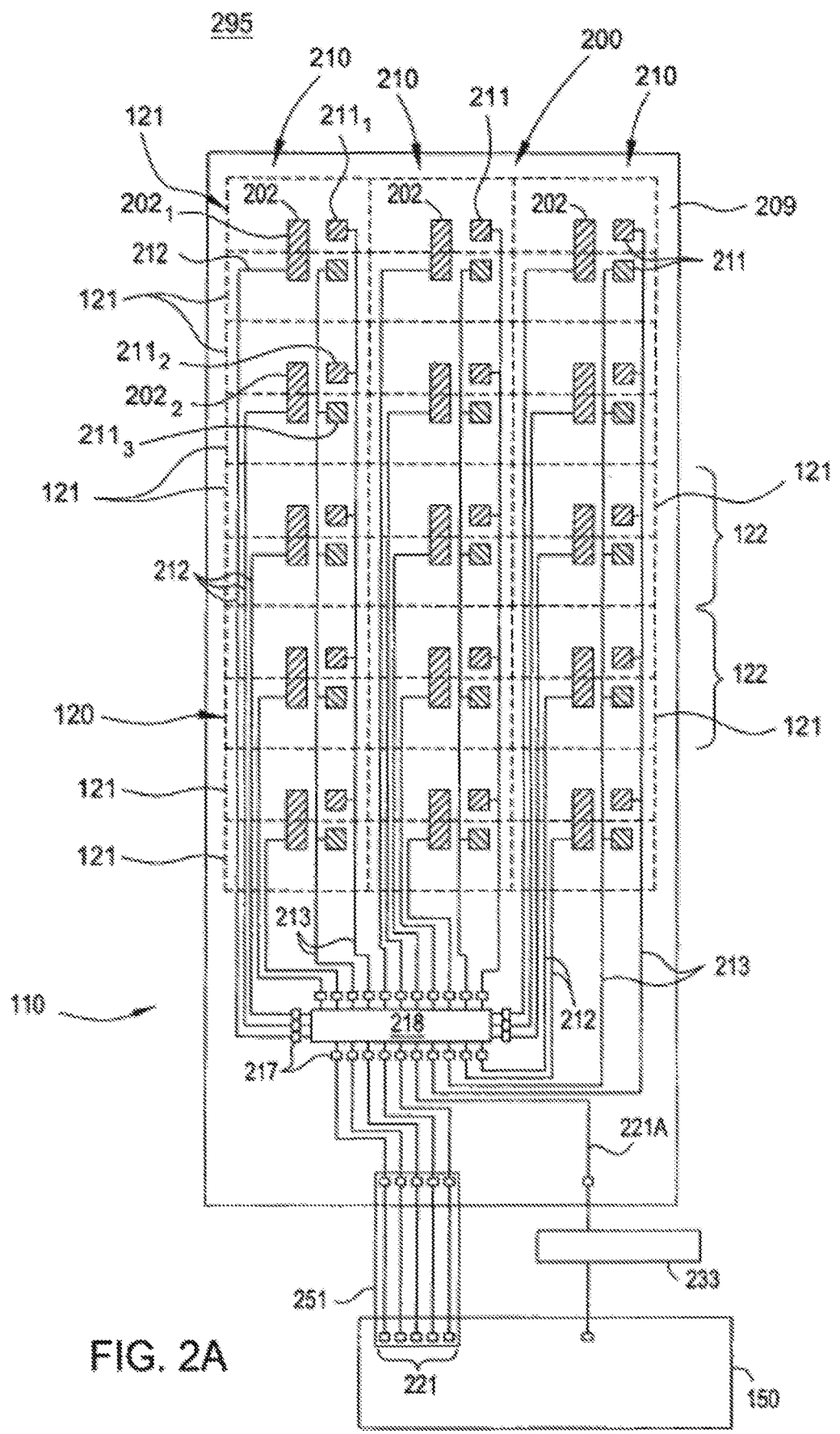
FIGS. 2A-2C show an input device having sensor electrodes disposed on a single layer, in accordance with some embodiments.

FIG. 2A shows an input device 295 having sensor electrodes disposed on a single layer, in accordance with some embodiments. One will note that the input device 295 may be formed as part of a larger input device 100, which is discussed above. In general, the sensor electrode pattern disclosed herein comprises a sensor array 200 that includes a plurality of sensor electrode sub-arrays 210 that include a plurality of arrays of sensor electrodes that include a plurality of sensor electrodes, such as sensor electrodes 202 and 211, that are arranged and interconnected in a desirable manner to reduce or minimize the number of traces and/or sensor electrodes required to sense the positional information of an input object within the sensing region 120 of the input device 295.

While FIG. 2A illustrates a pattern of simple rectangles used to represent the sensor electrodes, this configuration is not meant to be limiting and in other embodiments, various other sensor electrode shapes may be used as discussed further herein. For example, in some embodiments, sensing elements 121 comprise two or more sensor electrodes, for example, sensor electrodes 202 and 211 that may be similar or different in size and/or shape. In general, a sensor electrode includes an electrode region, or portion of the sensor electrode that is intended to capacitively couple to another sensor electrode, and a trace. In one example the electrode region has a polygonal shape, such as electrode regions 203 or electrode region 204 illustrated in FIG. 2C.

A trace, such as trace 212 or trace 213 in FIG. 2A, is used to connect the electrode region to other electrode regions or other electronic components in the input device 295. In one example, as shown, these sensor electrodes are disposed in a sensor electrode pattern that comprises a first plurality of sensor electrodes 202 (e.g., 15 shown) and a second plurality of sensor electrodes 211 (e.g., 30 shown), which are disposed on the same layer as the first plurality of sensor electrodes 202. Sensor electrodes 202 and sensor electrodes 211 may be ohmically isolated from one another, by use of insulating materials or a physical gap formed between the electrodes to prevent them from electrically shorting to each other.

In some configurations, two or more sensing elements 121 may form a larger unit cell 122. A unit cell 122 includes a grouping of sensor electrodes that are repeated within a sensor electrode sub-array 210 and/or in a repeating pattern across the sensing region 120 (e.g., multiple sensor electrode sub-arrays 210). The unit cell 122 is the smallest unit a symmetric grouping of sensor electrodes can be broken into within an electrode pattern formed across the sensing region 120. As illustrated in FIG. 2A, in one example, the unit cell 122 includes two sensing elements 121, which each contain a portion of the sensor electrode 202 and the sensor electrode 211, and thus the unit cell 122 comprises a sensor electrode 202 and two sensor electrodes 211.

The sensor electrode pattern of FIG. 2A may utilize various sensing techniques, such as mutual capacitive sensing, absolute capacitive sensing, elastive, resistive, inductive, magnetic acoustic, ultrasonic, or other useful sensing techniques, without deviating from the scope of this disclosure. In some aspects, sensor electrode 202 maybe be a transmitter electrode and sensor electrode 211 may be a receiver electrode. In other aspects, sensor electrode 211 may be a transmitter electrode and sensor electrode 202 may be a receiver electrode.

In some embodiments, the sensing elements 121 may comprise a plurality of transmitter and receiver electrodes that are formed in a single layer on a surface of a substrate 209. In one configuration of the input device 295, each of the sensor electrodes may comprise one or more transmitter electrodes (e.g., sensor electrodes 202) that are disposed proximate to one or more receiver electrodes (e.g., sensor electrodes 211). For example, the input device 295 may operate by detecting the change in capacitive coupling between one or more of the driven transmitter sensor electrodes and one or more of the receiver electrodes, as similarly discussed above. In some aspects, the transmitter and receiver electrodes may be disposed in such a way such that jumpers and/or extra layers used to form the area of capacitive sensing pixels are not required.

In some implementations, the transmitter electrodes and receiver electrodes may be formed in an array on the surface of a substrate 209 by first forming a blanket conductive layer on the surface of the substrate 209 and then performing an etching and/or patterning process (e.g., lithography and wet etch, laser ablation, etc.) that ohmically isolates each of the transmitter electrodes and receiver electrodes from each other. In other implementations, the sensor electrodes may be patterned using deposition and screen printing methods. As illustrated in FIG. 2A, these sensor electrodes may be disposed in an array that comprises a rectangular pattern of sensing elements 121, which may comprise one or more transmitter electrodes and one or more receiver electrodes. For example, the blanket conductive layer used to form the transmitter electrodes and receiver electrodes may comprise a thin metal layer (e.g., copper, aluminum, etc.) or a thin transparent conductive oxide layer (e.g., ATO, ITO, Zinc oxide) that is deposited using convention deposition techniques known in the art (e.g., PVD, CVD).

In some aspects, patterned isolated conductive electrodes (e.g., electrically floating electrodes) may be used to improve visual appearance. For example, the sensor electrodes may be formed from a material that is substantially optically clear, and thus, in some configurations, can be disposed between a display device and the input device user. In some other configurations, a substantially transparent (e.g. less than 50% space filling) conductive metal mesh may be disposed between a display and the user. The conductive metal mesh may be configured to transmit a substantial fraction of each of the display's pixels which it covers, and may be patterned and aligned relative to the pixels and/or RGB sub-pixels such that viewing angle is not substantially affected (e.g., allowing 80 degree off-angle viewing without significant color shift or brightness loss). For example, a metal mesh with widths of less than 5 microns may be patterned on a thin film (e.g., less than 20 microns) encapsulation layer of an OLED display with a spacing away from each covered pixel such that a more than 35 degree angle from vertical light ray may pass from the display pixels to the user.

The areas of localized capacitive coupling formed between at least a portion of one or more sensor electrodes 202 and at least a portion of one or more sensor electrodes 211 may be termed a "capacitive pixel," "capacitive sensing pixel" or also referred to herein as the sensing element 121. For example, as shown in FIG. 2A, the capacitive coupling in a sensing element 121 may be created by the electric field formed between at least a portion of the sensor electrodes 202 and a sensor electrode 211, which changes as the proximity and motion of input objects across the sensing region changes.

In transcapacitive sensing implementations, since a driven transmitter electrode can capacitively couple with multiple receiver electrodes disposed within the sensing region 120, the phrase "directly coupled to" or "directly capacitively coupled to" is used herein to help clarify the capacitive sensing elements that are intended to form a part of a sensing element 121. For example, directly coupled sensor electrodes may include a transmitter electrode and a receiver electrode that is the transmitter electrode's nearest neighbor. One skilled in the art will appreciate that the capacitive coupling between nearest neighbors may be created by the electric fields formed at or near the edges of the nearest neighbor electrodes.

The phrase "adjacent sensor electrodes" is used herein to describe nearest neighbor sensor electrodes that are separated by a physical gap or have a minimal capacitive coupling affecting obstruction disposed between the adjacent electrodes. For example, the transmitter electrode $202_1$ in FIG. 2A can be said to be adjacent to receiver electrode $211_1$ since the sensor electrodes are separated only by a physical gap. In another example, the transmitter electrode $202_2$ can be said to be adjacent to receiver electrode $211_2$ even though a trace 213 is disposed between the electrodes because the size of the trace is significantly smaller than the useful electrode region of the sensor electrodes. It is noted that the measured change in capacitance created by the interaction of an input object 140 and the electric field lines created between the transmitter electrode $202_2$ and receiver electrode $211_2$ is primarily due to the interaction of the input object 140 and the electric field lines that pass through a region that is above the plane, or planes, that the electrodes reside in, such as above the surface of a lens disposed over a portion of the input device 100. Therefore, the presence of the trace 213 between the transmitter electrode $202_2$ and receiver electrode $211_2$ may have a negligible effect on the measured change in capacitance detected by the processing system 110.

The sensing elements 121 are "scanned" to detect the capacitive couplings between sensor electrodes. For example, the input device 295 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. In one example, the transmitter electrodes are the sensor electrodes 202 and the receiver electrodes are the sensor electrodes 211. However, in actual implementations, any of the sensor electrodes described herein may perform the functions of a transmitter electrode and/or a receiver electrode.

In some aspects, multiple sensor electrodes 202 may transmit different transmitter signals according to one or more coding schemes that enable their combined effects on the resulting signals received by the receiving sensor electrodes, or sensor electrodes 211, to be independently determined. Where the multiple transmitter electrodes simultaneously transmit different transmitter signals (e.g., different phase, amplitude, frequency), the transmissions may be encoded such that the resulting charge transfer is sufficiently orthogonal (e.g., transmissions are independent functions) such that they may be decoded. For example, a Unitary Hadamard matrix may be used for both coding and decoding. An input object in contact with (or proximity of) the sensing region may affect (e.g., reduce the fringing coupling) of the resulting signals.

The receiver electrodes, or a corresponding sensor electrode 211, may be operated singly or multiply to acquire resulting signals created from the transmitter signal. The resulting signals may indicate the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. In various embodiments, the sensing image, or capacitive image, comprises data received during a process of measuring the resulting signals received with at least a portion of the sensing elements 121 distributed across the sensing region 120. In one example, a capacitive image, or sensing image, comprises data received during a process of measuring the resulting signals received across all of the sensing elements 121 during a single scan cycle of the sensing region 120. The resulting signals may be received at one instant in time, or by scanning the rows and/or columns of sensing elements distributed across the sensing region 120 in a raster scanning pattern (e.g., serially polling each sensing element separately in a desired scanning pattern), row-by-row scanning pattern, column-by-column scanning pattern or other useful scanning technique.

In some touch screen embodiments, the sensing elements 121 are disposed on a substrate of an associated display device. For example, the sensor electrodes 202 and/or the sensor electrodes 211 may be disposed on a polarizer, a color filter substrate, or a glass sheet of an LCD. As a specific example, the sensor electrodes 202 and 211 may be disposed on a TFT (Thin Film Transistor) substrate of an LCD type of the display device, a color filter substrate, on a protection material disposed over the LCD glass sheet, on a lens glass (or window), and the like. The electrodes may be separate from and in addition to the display electrodes, or may share functionality with the display electrodes. Similarly, an extra layer may be added to a display substrate or an additional process such as patterning applied to an existing layer.

Where sensor electrodes of each of the sensing elements 121 are disposed on a substrate within the display device (e.g., color filter glass, TFT glass, polyimide, etc.), the sensor electrodes may be comprised of a substantially transparent material (e.g., ITO, ATO, ClearOhm™, etc.) or they may be comprised of an opaque material and aligned with the pixels of the display device (e.g., a metal mesh). Electrodes may be considered substantially transparent in a display device if their reflection (and/or absorption) of light impinging on the display is such that human visual acuity is not disturbed by their presence. This may be achieved by matching indexes of refraction, making opaque lines narrower, reducing fill percentage or making the percentage of material more uniform, reducing spatial patterns (e.g., moiré) that are with visible to the human eye, and the like.

The processing system 110 of the input device 295 comprises a sensor controller 218 that is coupled through connectors 217 to each of the transmitter and receiver electrodes, such as sensor electrodes 202 and 211, through one or more traces (e.g., traces 212 and 213, respectively). The sensor controller 218 may transmit the transmitter signal and receive the resulting signals from receiver electrodes. The sensor controller 218 may also communicate the positional information received by the sensing elements 121 to the electronic system 150 and/or the display controller 233, which is also coupled to the electronic system 150. The sensor controller 218 may be coupled to the electronic system 150 using one or more traces 221 that may pass through a flexible element 251 and be coupled to the display controller 233 using one or more traces 221A that may pass through the same flexible element 251 or a different connecting element, as shown.

The functions of the sensor controller 218 and the display controller 233 may be implemented in one integrated circuit that can control the display module elements and drive and/or sense data delivered to and/or received from the sensor electrodes. In various embodiments, calculation and interpretation of the measurement of the resulting signals may take place within the sensor controller 218, display controller 233, a host electronic system 150, or some combination of the above. In some configurations, the processing system 110 may comprise transmitter circuitry, receiver circuitry, and memory that is disposed within one or any number of ICs found in the processing system 110, depending to the desired system architecture.

Figure 2B:
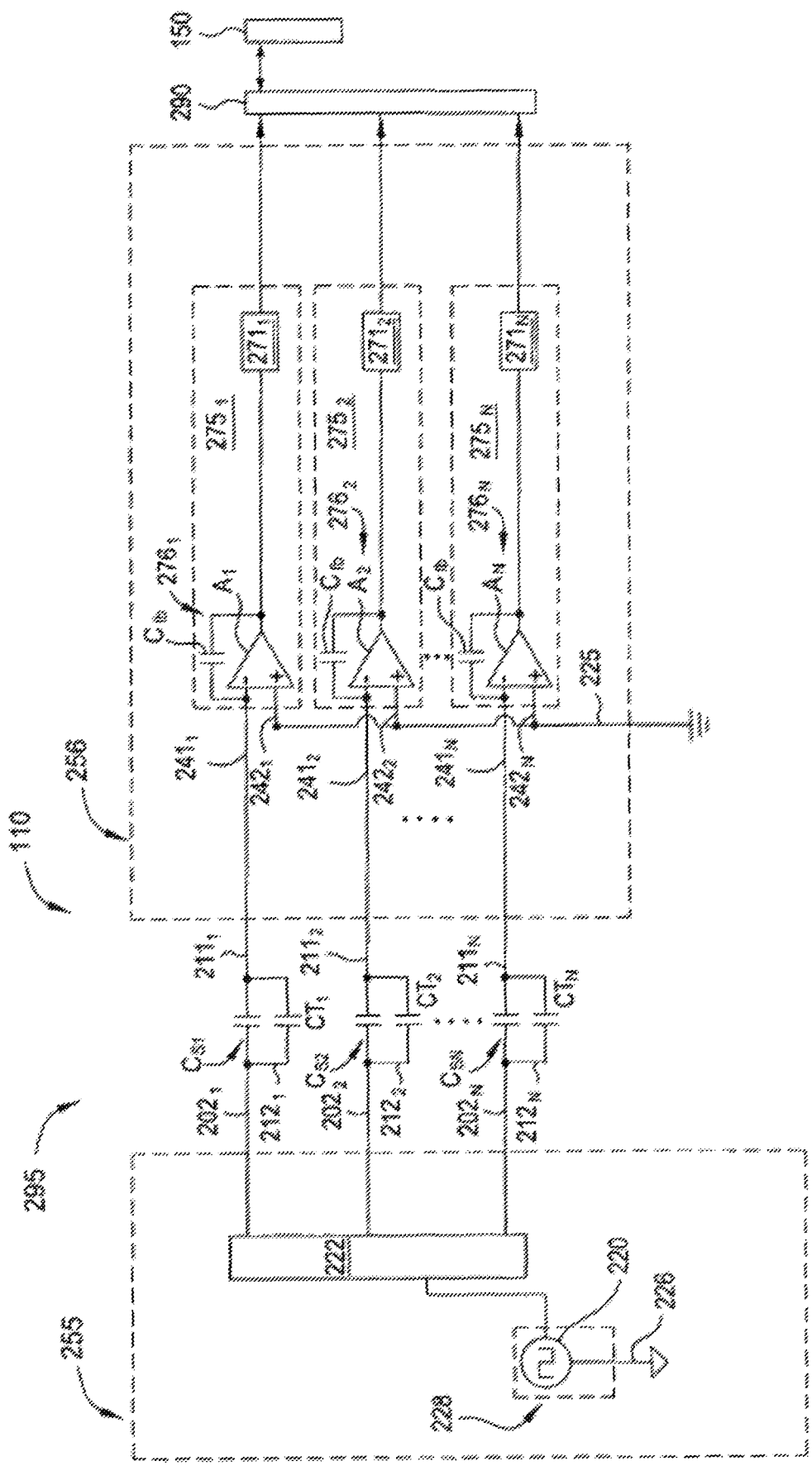

FIG. 2B shows a more detailed embodiment of the processing system 110 of the input device 295. The sensor controller 218 includes a signal generating processor 255 and sensor processor 256 that work together to provide touch sensing data to an analysis module 290 and the electronic system 150. The analysis module 290 may be part of the processing system 110, the sensor processor 256 and/or part of the electronic system 150. In various embodiments, the analysis module 290 comprises digital signal processing elements and/or other useful digital and analog circuit elements that are connected together to process the receiver channel output signal(s) received from at least one receiver channel that is coupled to a receiver electrode, and also provide processed signals to other portions of the electronic system 150. The electronic system 150 may use the processed signals to control various aspects of the input device 295.

As illustrated in FIG. 2B, the signal generating processor 255 and the sensor processor 256 work together to provide receiver channel output signals to the analysis module 290 and/or the electronic system 150. As discussed above, the positional information of an input object 140 (FIG. 1) is derived based on the capacitance $C_S$ (e.g., capacitance $C_{S1}$, $C_{S2}$, ... $C_{SN}$) measured between each of the transmitter electrodes (e.g., sensor electrodes $202_1$, $202_2$, ... $202_N$) and the receiver electrodes (e.g., sensor electrodes $211_1$, $211_2$, ... $211_N$), wherein N is a positive integer.

Each of the transmitter electrodes (e.g., sensor electrodes $202_1$, $202_2$, ... $202_N$ in FIG. 2B) is connected to a trace (e.g., traces $212_1$, $212_2$, ... $212_N$ in FIG. 2B). Each trace has a certain amount of capacitance (e.g., transcapacitance) that is formed between the trace and the corresponding receiver electrode. As illustrated in FIG. 2B, the capacitance between a trace and a receiver is given by capacitance $C_T$ (e.g., capacitance $C_{T1}$, $C_{T2}$, ... $C_{TN}$) and can be measured between each of the trace (e.g., traces $212_1$, $212_2$, ... $212_N$) and a receiver electrode (e.g., $211_1$, $211_2$, ... $211_N$) at various points along the trace (e.g., Y-direction in FIG. 2C), where N is a positive integer. As shown, each trace capacitance $C_T$ (e.g., capacitance $C_{T1}$, $C_{T2}$, ... $C_{TN}$) is in parallel with a transmitter capacitance $C_S$ (e.g., capacitance $C_{S1}$, $CS_2$, ... $C_{SN}$). Parasitic capacitance may result from an input object positioned over a trace (or background circuitry, such as display electrodes), where the input device detects a change in the capacitance at an associated pixel (e.g., sensed resulting signal provided by the associated sensing element 121), due to the change in the trace capacitance $C_T$ (e.g., capacitance $C_{T1}$, $C_{T2}$, ... $C_{TN}$).

In some embodiments, the signal generating processor 255 comprises a driver 228, which is adapted to deliver capacitive sensing signals (transmitter signals) to the transmitter electrodes. In one configuration, the driver 228 may comprise a power supply and signal generator 220 that is configured to deliver a square, rectangular, trapezoidal, sinusoidal, Gaussian or other shaped waveforms used to form the transmitter signal(s) to the transmitter electrodes. In one configuration, the signal generator 220 comprises an electrical device, or simple switch, that is able to deliver a transmitter signal that transitions between the output level of the power supply and a low display voltage level. In various embodiments, signal generator 220 may comprise an oscillator. In some configurations, the signal generator 220 is integrated into the driver 222, which includes one or more shift registers (not shown) and/or switches (not shown) that are adapted to sequentially deliver transmitter signals to one or more of the transmitter electrodes at a time.

In the example of FIG. 2B, the sensor processor 256 comprises a plurality of receiver channels 275 (e.g., receiver channels $275_1$, $275_2$, ... $275_N$) each having a first input port 241 (e.g., ports $241_1$, $241_2$, ... $241_N$) that is configured to receive the resulting signal received with at least one receiver electrode (e.g., sensor electrode $211_1$, $211_2$, ... $211_N$), a second input port (e.g., ports $242_1$, $242_2$, ... $242_N$) that is configured to receive a reference signal delivered through the line 225, and an output port coupled to the analysis module 290 and electronic system 150. Typically, each receiver channel 275 is coupled to a single receiver electrode. Each of the plurality of receiver channels 275 may include a charge accumulator 276 (e.g., charge accumulators $276_1$, $276_2$, ... $276_N$), supporting components 271 (e.g., components $271_1$, $271_2$, ... $271_N$) such as demodulator circuitry, a low pass filter, sample and hold circuitry, other useful electronic components such as filters and analog/digital converters (ADCs) or the like. In some aspects, the charge accumulator 276 includes an integrator type operational amplifier (e.g., Op Amps $A_1$-$A_N$) that has an integrating capacitance $C_{fb}$ that is coupled between the inverting input and the output of the device.

Due to the type of electronic elements required to detect and process the received resulting signals, the cost required to form each receiver channel 275 is generally more expensive than the cost required to form the components in the signal generating processor 255 that provides the transmitter signal(s) to a transmitter electrode(s). However, in some embodiments, it may be desirable to reduce the number of transmitter electrodes to increase the scanning speed of the capacitive sensing type input device. In these configurations, it is generally desirable to maintain the same capacitive pixel density to maintain the input object position sensing accuracy. One skilled in the art will appreciate that delivering a capacitive sensing signal to a single transmitter electrode and then measuring the resulting signals on each of the receiver electrodes in the sensing region may provide a much faster capacitive sensing scanning process than sequentially delivering capacitive sensing signals in time to two or more transmitters then sensing the received resulting signals after each sequential scanning step.

Moreover, there is a benefit to reducing the number of traces used in an input device, since this will reduce the complexity and cost of the input device. The sensing region 120 may require hundreds or even thousands of sensing elements 121 to reliably sense the position of one or more input objects. The reduction in the number of traces that need to be routed to the various processing system 110 components is desirable for a number of reasons, which include a reduction in the overall cost of forming the input device 100, a reduction in the complexity of routing the multitude of traces within the sensing region 120, a reduced interconnecting trace length due to reduced routing complexity, a reduction in the cross-coupling of signals between adjacently positioned traces, and allowing for a tighter packing or increased density of sensor electrodes within the sensing region 120. Reducing the number of traces may also reduce the amount of cross-coupling between the traces due to a reduction in the required trace density and number of traces that will transmit or receive signals delivered to or from adjacently positioned sensor electrodes or traces.

Aspects of the present disclosure describe an electrode array configuration that reduces or minimizes the number of traces and/or electrodes required to sense the position of an input object within the sensing region 120 using capacitive pixels that contain unique pairs of sensor electrodes to reliably determine the position of an input object. In some transcapacitive sensing embodiments, transmitter and/or receiver type sensor electrodes are interconnected together to reduce the number of traces that need to be coupled to the processing system components. Reducing the number of electrode connections, and thus supporting components (e.g., receiver channels), may allow for designs that can reduce the production cost and system complexity, even when a larger number of electrodes are required.

Figure 2C:
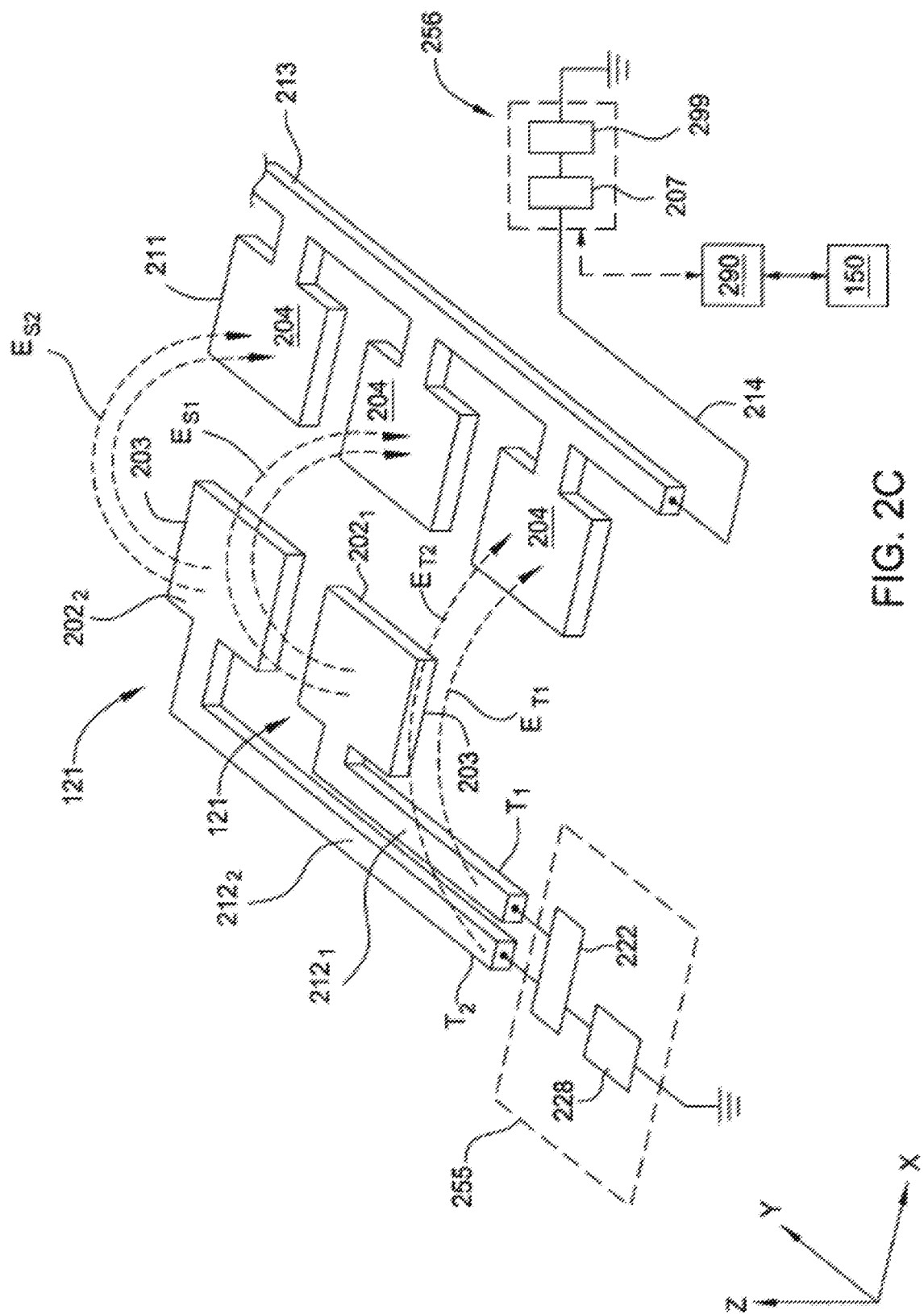

FIG. 2C shows an example configuration of the sensing elements 121 of the input device 100. As illustrated in FIG. 2C, a sensor electrode (e.g., corresponding to one of the sensing elements 121) may generally comprise an electrode region and a trace. For example, the sensor electrodes depicted in FIG. 2C may include electrode regions 203 and 204 and traces 212 and 213, respectively. For simplicity, only two transmitter electrodes ($202_1$, $202_2$) are shown. In some aspects, each of the two sensing elements 121 illustrated in FIG. 2C comprises a transmitter electrode $202_1$ or $202_2$ and a portion of a group of the interconnected electrode regions 204 that form the receiver electrode 211. The electrode regions 204 of the receiver electrode 211 interact with the electrode regions 203 of the two transmitter electrodes $202_1$, $202_2$ and two corresponding traces $212_1$, $212_2$ when a sensing signal is provided to the transmitter electrodes of each sensing element 121.

The processing system 110 includes a signal generating processor 255 and a sensor processor 256 that work together to provide capacitive sensing receiver channel output signals to the analysis module 290 and electronic system 150. As discussed above, the processing system derives the positional information of an input object 140 (FIG. 1) based on the capacitance measured between each of the transmitter electrodes and the receiver electrodes contained in the sensing region 120. In various embodiments, the sensor processor 256 may include digital signal processing elements and/or other useful digital and analog circuit elements that are connected together to process the receiver channel output signal(s) received from at least one receiver channel that is coupled to each of the receiver (Rx) electrodes 211. In some aspects, the electronic system 150 may use the processed signals to control various aspects of the input device 295.

In the example of FIG. 2C, the signal generating processor 255 comprises a driver 228, which is adapted to sequentially deliver capacitive sensing signals (transmitter signals) to the transmitter (Tx) electrodes $202_1$, $202_2$ in the array of sensing elements. In some embodiments, the sensor processor 256 comprises a plurality of receiver channel(s) 207 that each have a first input port 241 that is configured to receive the resulting signal received by at least one receiver electrode 211, and an output port coupled to the analysis module 290. Typically, each receiver channel 207, which can be the same as a receiver channel 275 discussed above, may be coupled to a single receiver electrode 211. In one configuration, the sensor processor 256 further comprises an electromagnetic interference (EMI) filter 299 that is adapted to filter EMI induced by other input device components.

Traces $212_1$, $212_2$ connect the driver 222 to the transmitter electrodes $202_1$, $202_2$, respectively. For example, trace $212_1$ connects the driver 222 to transmitter electrode $202_1$ and trace $212_2$ connects the driver 222 to transmitter electrode $202_2$. The capacitance between trace $212_1$ and the receiver electrode 211 is associated with an electric field $E_{T1}$. The capacitance between trace $212_2$ and the receiver electrode 211 is associated with an electric field $E_{T2}$. The capacitance between transmitter electrode $202_1$ and the receiver electrode 211 is associated with an electric field $E_{S1}$. The capacitance between transmitter electrode $202_2$ and the receiver electrode 211 is associated with an electric field Est.

When an input object (e.g., finger) is positioned near, such as over an electrode region 203 of a transmitter electrode $202_1$, $202_2$ and an electrode region 204 of a receiver electrode 211, the associated trace may also see a change in capacitance (and corresponding electric field). For example, if an input object (e.g., finger) is in contact with, or hovers over, transmitter electrode $202_1$, the electric field $E_{S1}$ tends to change, along with the electric field $E_{T1}$ generated between trace $212_1$ and the receiver electrode 211. Likewise, if an input object (e.g., finger) is in contact with, or hovers over, transmitter electrode $E_{S2}$, the electric field $E_{S2}$ tends to change along with the electric field $E_{T2}$ generated between the trace $212_2$ and the receiver electrode 211.

Where an input object (e.g., finger) is near a trace $212_1$, $212_2$, when a sensing signal is provided, a change in capacitance (and corresponding electric field) between the trace and the receiver electrode 211 will be measured by the sensor processor 256. The position of the input object near a trace $212_1$, $212_2$ will cause a change in the electric field generated between the trace and the receiver electrodes, and thus affect the measured resulting signal measured by the sensor processor 256. For example, if an input object (e.g., finger) is in contact with, or hovers over, trace $212_1$, the electric field $E_{T1}$ tends to change, which is seen as a change in the resulting signal delivered by the transmitter electrode $202_1$ to the receiver electrode 211. Likewise, if an input object (e.g., finger) is in contact with, or hovers over, trace $212_2$, the electric field $E_{T2}$ tends to change, which is seen as a change in the resulting signal delivered by the transmitter electrode $202_2$ to the receiver electrode 211. The capacitance changes at the traces $212_1$, $212_2$ may also affect the capacitive coupling of the connected transmitter electrode(s) $202_1$, $202_2$ to the receiver electrode 211, respectively. Such capacitance changes associated with an input object (e.g., finger) being over a trace may be referred to as "parasitic capacitance." As further described below, the input device is configured to correct parasitic capacitance in order to carry out object detection algorithms more accurately.

Figure 3:
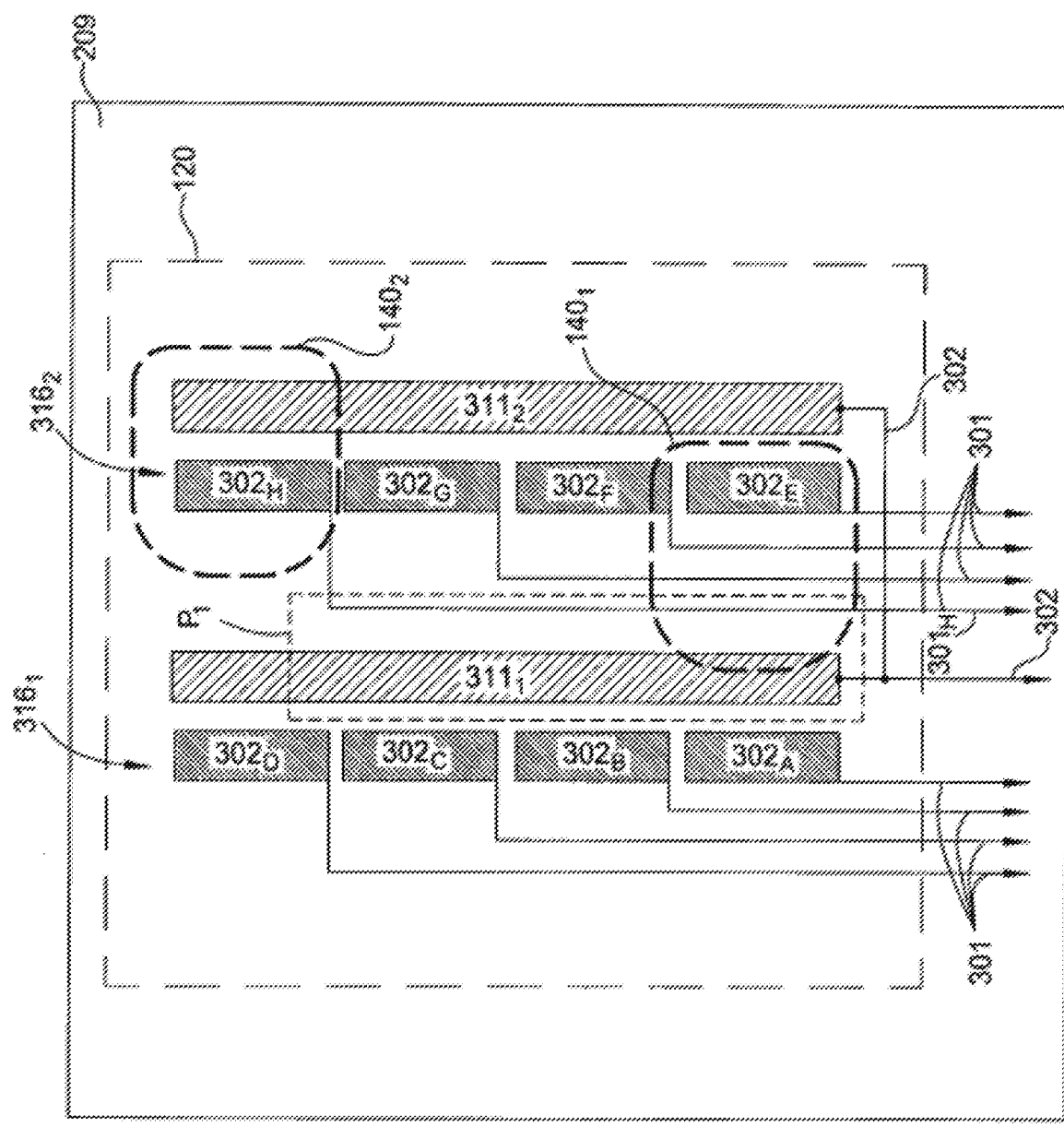
FIG. 3 shows a single-layer sensor electrode configuration, in accordance with some embodiments.

FIG. 3 shows a single-layer sensor electrode configuration, in accordance with some embodiments. More specifically, FIG. 3 depicts a portion of a sensing region 120 formed on a substrate 209 that includes a plurality of sensor electrodes that are used to sense the position of an input object within the sensing region 120 using a transcapacitive sensing method. The input device includes two arrays of transmitter electrodes 316 and two receiver electrodes 311. The first array of transmitter electrodes $316_1$ includes transmitter electrodes 302A-302D that are each coupled to a separate trace 301 and the second array of transmitter electrodes $316_2$ include transmitter electrode regions 302E-302H that are each coupled to a separate trace 301. In the example of FIG. 3, the input device is shown to include one receiver electrode $311_1$ that is positioned to directly couple with the transmitter electrodes 302A-302D in the first array of transmitter electrodes $316_1$ and only one receiver electrode $311_2$ that is positioned to directly couple with the transmitter electrode regions 302E-302H in the second array of transmitter electrodes $316_2$. However, the configuration of sensor electrodes shown in FIG. 3 is not intended to be limiting as to the scope of the disclosure.

As described above, to reduce the overall cost of forming the input device 100, reduce the system complexity, reduce the cross-coupling of signals between adjacently positioned traces and the costs to detect and process the resulting signals generated during a capacitive sensing process, the receiver electrodes $311_1$ and $311_2$ are electrically coupled together, such that a single trace 302 is connected to the processing system 110 components (not shown), such as the sensor controller 218 (not shown). A reduction in the cost of the overall input system can be realized by reducing the number of electrode traces, especially by reducing the number of traces that are coupled to receiver electrodes, due to the cost required to form the components used to receive and process the received resulting signals. Therefore, in some embodiments, at least two sensor electrodes may be connected to two or more sensor electrodes in two different arrays of sensor electrodes, that are positioned a distance apart from each other within the sensing region 120.

By interconnecting the sensor electrodes prior to their connection to the processing system 110, the number of traces that are required to couple with the processing system 110 components may be reduced. For example, the traces of multiple receiver electrodes may be electrically coupled to reduce the number of required connections made to the signal processing components within the sensor processor 256 (e.g., receiver channels 275) in the processing system 110. As a result, the ratio of the number of transmitter traces to receiver traces is greater than one. By coupling the receiver electrodes together, the number of required receiver channels will be reduced, thus reducing the cost and complexity of the processing system 110. However, in some configurations, it may also be desirable to have more transmitter electrodes regions than receiver electrodes regions (e.g., ratio of transmitter electrodes to receiver electrodes is greater than one), since a fully enabled transmitter electrode generally costs less to manufacture than a fully enabled receiver electrode.

In some implementations, the traces of multiple transmitter electrodes may be electrically coupled together to reduce the number of required connections made to the signal driving components within the generating processor 255 in the processing system 110 and/or to improve the scanning speed of the input device. In yet another example, the number of traces used to couple the transmitter electrodes and the receiver electrodes to their various signal processing components may be reduced by interconnecting the traces of each type of electrode. However, coupling both types of transcapacitive sensing electrodes to electrodes of the same type (e.g., transmitter electrodes to transmitter electrodes and receiver electrodes to receiver electrodes) can lead to capacitive sensing issues associated with correctly determining the position of an input object. Therefore, as will be discussed further below, some embodiments include interconnected electrodes that only form unique pairs of transmitter and receiver electrodes.

In some sensor electrode configurations, as illustrated in FIG. 3, the interconnection between some types of sensor electrodes, such as receiver electrodes $311_1$ and $311_2$, can produce misleading or false input object position determination(s) by the processing system. The misleading or false determination of the input objects position can be due to the cross-coupling between transmitter electrodes and/or transmitter electrode traces and the two or more receiving electrodes that are interconnected together within the sensing region 120.

For example, due to the interconnection of the two receiver electrodes $311_1$ and $311_2$, as shown in FIG. 3, the processing system may not be able to determine whether an input object 140 is in the first input object position $140_1$ or in the second input object position $140_2$. This problem may arise from the cross-coupling of the trace 301H and the first receiver electrode $311_1$ and the intended direct coupling of the electrode region 302H and the second receiver electrode $311_2$, since the processing system 110 may be unable to determine whether the input object is over the first receiver electrode $311_1$ or the second receiver electrode $311_2$. It is noted that, when the sensor electrode region 302H is driven for capacitive sensing, the trace 301H will capacitively couple to the first sensor electrode $311_1$ (e.g., within region $P_1$) and the electrode region 302H will directly couple to the second sensor electrode $311_2$. Since the input object could be in more than one position within the sensing region 120 (e.g., input object position $140_1$ or $140_2$), and still provide the same or a similar resulting signal to the sensor processor portion of the processing system, it may not be possible to determine the actual position of the input object.

Therefore, in some embodiments, a revised sensor electrode layout may be able to accurately sense the position of an input object 140, while also having a reduced number of interconnecting traces is needed. FIGS. 4-8 illustrate a few examples of various configurations that can be used to meet these goals. These examples are provided herein to help explain various aspects of the embodiments and are not intended to limit the scope of the disclosure. While FIGS. 4-8 illustrate a sensor electrode configuration that includes one or more arrays of receiver electrodes that are interconnected to form two groups of sensor electrodes, this configuration is not intended to be limiting as to the scope of the disclosure. One skilled in the art will appreciate that one or more of the arrays of sensor electrodes could be formed so that it contains fewer or more groups of receiver electrodes that contain one or more sensor electrodes without deviating from the scope of the disclosure.

Also, while FIGS. 4-8 illustrate a sensor electrode configuration that includes one or more arrays of transmitter electrodes, such as arrays of sensor electrodes 415, which contain a plurality of sensor electrodes 402, for example may include sensor electrode regions 402A-402H (FIG. 4), that are each separately connected to the processing system 110 through a trace 412, this configuration is not intended to be limiting as to the scope of the disclosure. One skilled in the art will appreciate that one or more of the separately connected traces 412 can be interconnected inside or outside of the sensing region 120 before they are coupled with the processing system 110 components without deviating from the scope of the disclosure.

Figure 4:
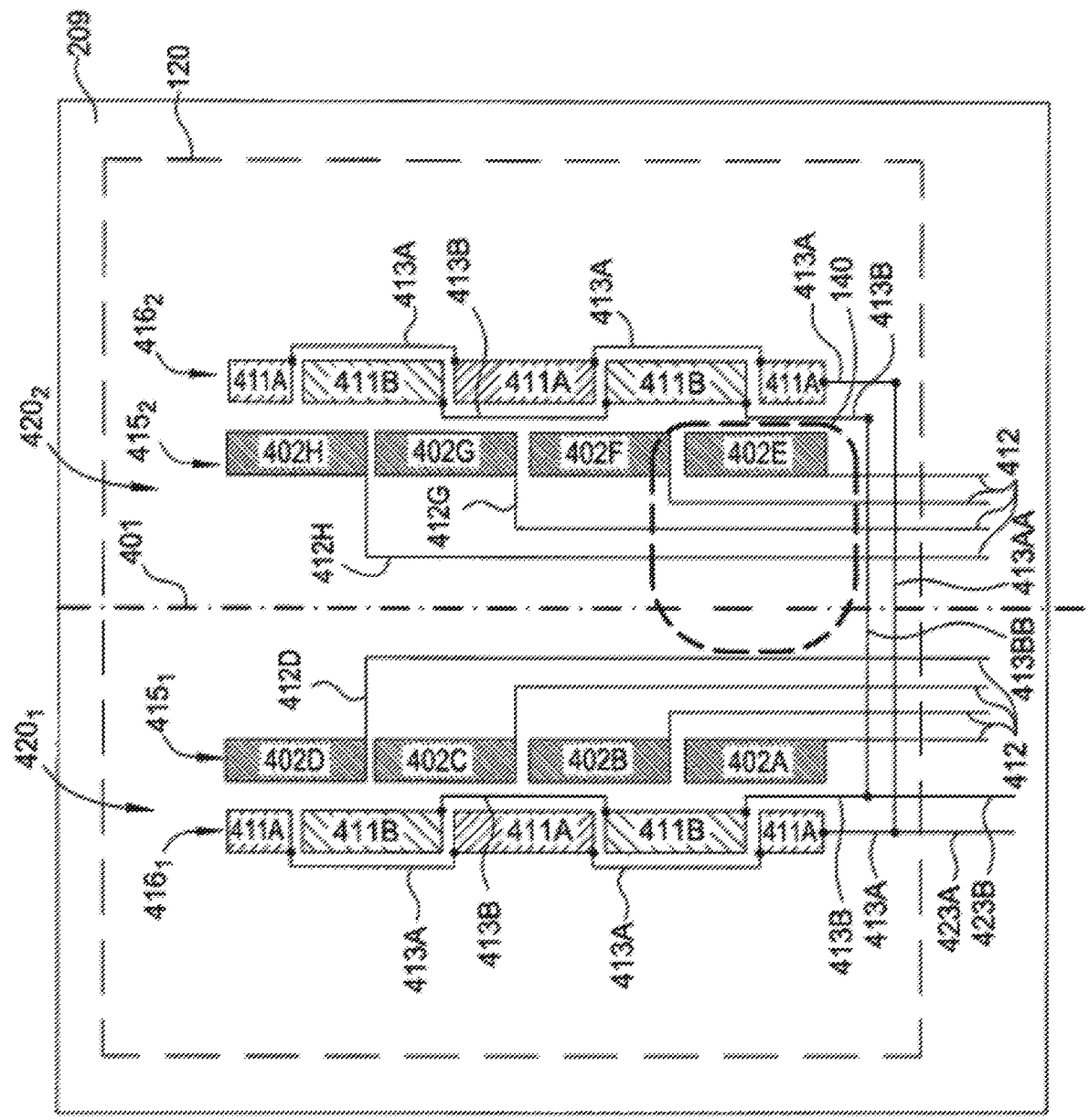
FIG. 4 shows a single-layer sensor electrode configuration including two sets of sensor electrode arrays, in accordance with some embodiments.

FIG. 4 shows a single-layer sensor electrode configuration including two sets of sensor electrode arrays, in accordance with some embodiments. More specifically, FIG. 4 shows a portion of a sensing region 120 formed on a substrate 209 that includes a plurality of sensor electrodes that are used to accurately sense the position of an input object within the sensing region 120 using a transcapacitive sensing method. The input device in this example includes two sets of sensor electrode arrays $420_1$, $420_2$ each including an array of transmitter electrodes $415_1$ or $415_2$ and an array of receiver electrodes $416_1$ or $416_2$.

The first array of transmitter electrodes $415_1$ includes transmitter electrode regions 402A-402D that are each coupled to a separate trace 412 and the second array of transmitter electrodes $415_2$ includes transmitter electrode regions 402E-402H that are each coupled to a separate trace 412. The first array of receiver electrodes $416_1$ and second array of receiver electrodes $416_2$ each include a plurality of sensor electrodes that include receiver electrode regions 411A, 411B and traces 413A, 413B. The receiver electrode regions 411A and 411B in the first and second electrode arrays $416_1$, $416_2$ are each separately coupled together using a trace 413A or 413B, respectively.

By coupling the sensor electrodes in the first and second arrays of receiver electrodes $416_1$, $416_2$ together, the number of required connections to the processing system 110 is reduced. For example, a conventional sensing electrode design that requires one trace per receiver electrode would require 10 separate traces and connections (e.g., 10 electrode regions 411A and 411B) to the processing system 110 components (FIG. 2A), such as the sensor controller 218 (FIG. 2A). By connecting the sensor electrodes in the first and second arrays of receiver electrodes into one or more groups of sensor electrodes the number of separate traces and connections can be reduced.

In the example of FIG. 4, two groups of interconnected sensor electrodes are formed by interconnecting the electrode regions 411A and 411B using the traces 413A and 413B, respectively, in each array of sensor electrodes. Therefore, each of the two groups of electrodes in the arrays of sensor electrodes $416_1$, $416_2$ are interconnected via the interconnection traces 413AA, 413BB, respectively, so that only two separate traces 423A and 423B are required to separately connect the two groups of sensor electrodes with the processing system 110 components.

Due to the separate interconnection of transmitter electrode configuration, as illustrated in FIG. 4, each of the formed sensing elements contain unique pairs of transmitter and receiver electrodes that have a reduced total interconnection trace count from most conventional electrode configurations. As noted above, the embodiments herein may provide an electrode configuration that comprises multiple arrays of capacitive pixels that each includes unique pairs of sensor electrodes to reliably determine the position of an input object. Unique pairs to sensor electrodes generally include configurations where a first pair of sensor electrodes in a first capacitive pixel are both not interconnected with another pair of sensor electrodes in any of the other capacitive pixels in the sensing region.

For example, a pixel that includes a portion of the sensor electrode region 402D and a portion of sensor electrode region 411B in the array of sensor electrodes $415_1$ may not be unique from a pixel that includes a portion of the sensor electrode region 402G and a portion of sensor electrode region 411B in the array of sensor electrodes $415_2$ if the traces 412D and 412G were connected together so that these sensor electrodes send or receive capacitive sensing signals at the same time, since both of the electrodes of the same type are connected together and are used in the same two pixels (e.g., electrode regions 402D and 402G are connected together and electrode regions 411B in the array of sensor electrodes $415_1$ and electrode regions 411B in the array of sensor electrodes $415_2$ are connected together via the the interconnection trace 413BB). The presence of non-unique directly coupled pairs of sensing electrodes may lead to false and misleading input object position determinations as discussed above.

In some embodiments, the arrays of transmitter electrodes 415, and their associated traces 412, are positioned next to each other with no intervening array(s) of receiver electrodes 416 between them. By positioning the arrays of transmitter electrodes 415 and associated traces 412 next to each other, the cross-coupling of the traces 412 and either of the arrays of receiver electrodes $416_1$, $416_2$ is minimized, and the cross-coupling of transmitter electrodes in an array of transmitter electrodes that are not positioned to directly couple with the arrays of receiver electrodes $416_1$, $416_2$ is avoided. In this configuration, the arrays of transmitter electrodes 415 and associated traces 412 are positioned next to each other and are disposed between two or more arrays of receiver electrodes 416. In one example, when the sensor electrode region 402H is driven for capacitive sensing, the trace 412H is not positioned so that it will capacitively couple to the first sensor electrode region 411A or the second sensor electrode region 411B in the first or second arrays of sensor electrodes $415_1$ or $415_2$.

In some embodiments, two or more arrays of transmitter electrodes (e.g., arrays $415_1$ and $415_2$) are positioned adjacent to each other so that the gaps between the electrode regions 402A-402D and electrode regions 402E-402H is minimized by reducing the gaps formed between the traces and transmitter electrodes, while still being ohmically isolated from each other. The reduction in the gaps formed between the traces and transmitter electrodes will also improve the density of sensing elements 121 formed within the sensing region 120. In this example, one sensing element 121 is formed between electrode region 402D and the uppermost electrode region 411A in the first array of receiver electrodes $416_1$ and another sensing element 121 is adjacently formed between electrode region 402H and the uppermost electrode region 411A in the second array of receiver electrodes $416_2$.

In some sensor electrode configurations discussed herein, the arrays of sensor electrodes (e.g., transmitter and/or receiver electrodes) include a plurality of sensor electrode regions (e.g., electrode regions 402A-402D or 411A-411B) that are aligned along a first direction, such as the Y-direction shown in FIG. 4. In one example, the centroid of the area of the electrode regions in an array of sensor electrodes (e.g., electrode regions 402A-402D) are aligned along a first direction. In another example, an edge of the electrode regions in an array of sensor electrodes are aligned along a first direction. In yet another example, where the edge(s) of the electrode regions are non-linear, the alignment of the electrode regions may be found by comparing the orientation and alignment of the major axis of symmetry of the electrode regions.

In some embodiments, two or more arrays of sensing electrodes (e.g., arrays of sensor electrodes $415_1$ and $415_2$) are positioned adjacent to each other and are symmetric about a linear (e.g., axis) and/or non-linear symmetry line, so that a regular pattern of sensing elements 121 are formed across the sensing region 120. In one example, as shown in FIG. 4, the first array of transmitter electrodes $415_1$ and second array of transmitter electrodes $415_2$ are symmetric about a symmetry line 401, which in this example happens to be linear. As illustrated in FIG. 4, the electrode regions 402A-402D, and their associated traces 412, and electrode regions 402E-402H, and their associated traces 412, are also mirror images of each other. Also, in some configurations, the sets of sensor electrode arrays $420_1$, $420_2$ may be positioned a distance apart in a second direction (e.g., X-direction) that is orthogonal to or at an angle with a first direction that is parallel to the symmetry line and/or parallel to an alignment direction of an array of sensor electrodes (e.g., Y-direction for the electrode regions 402A-402D).

Due to the layout of the sensing electrodes disclosed herein, an input object 140 that is positioned over or near the electrode region 402E and traces 412 will primarily couple to the receiving electrodes in the second array of receiver electrodes $416_2$. Thus, by orienting the electrodes in this way the cross-coupling of the input object and the other connected receiver electrodes in the first array of receiver electrodes $416_1$ is reduced or completely removed.

Figure 5:
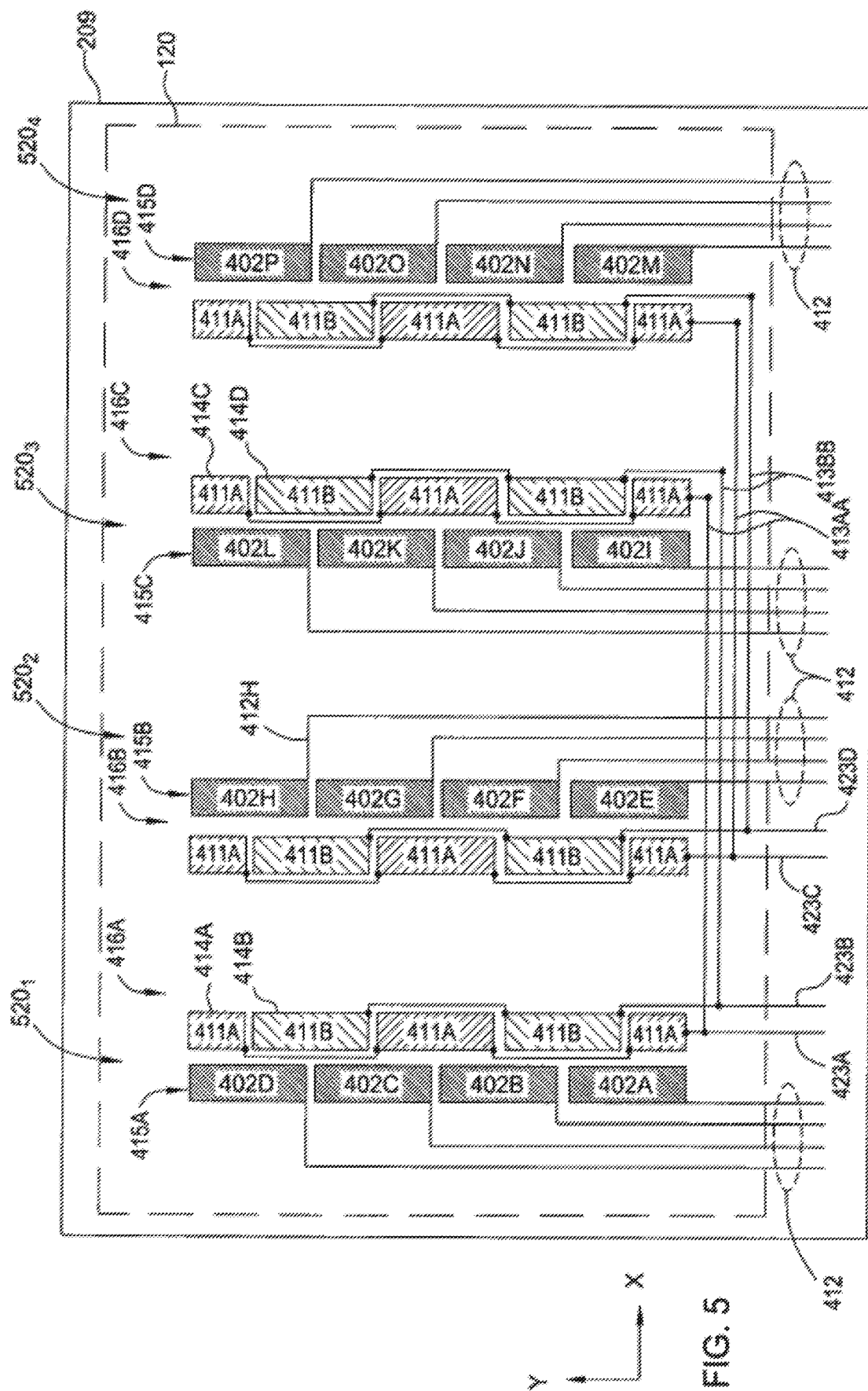
FIG. 5 shows a single-layer sensor electrode configuration including four sets of sensor electrode arrays, in accordance with some embodiments.

In the example of FIG. 5, the arrays of receiver electrodes 416, and their associated traces 413A-413B, are positioned next to each other with no intervening array(s) of transmitter electrodes 415 positioned between them. The input device depicted in FIG. 5 includes four sets of sensor electrode arrays $520_1$-$520_4$ that each contain two or more arrays of sensor electrodes, such as a first array of transmitter electrodes 415A and a first array of receiver electrodes 416A. By positioning the arrays of receiver electrodes and their associated traces next to each other, the cross-coupling of the arrays of receiver electrodes and non-directly coupled electrode regions is minimized, and the problem of false or misleading input object position determination can be eliminated.

In some embodiments, one or more groups of sensor electrodes in an array of sensor electrodes that are positioned within a first set of sensor electrode arrays are coupled with one or more groups of sensor electrodes in an array of sensor electrodes that are positioned within a second set of sensor electrode arrays to help reduce the number of traces that are required to sense the position of an input object within the sensing region 120. For example, as illustrated in FIG. 5, a first group of receiver electrodes 414A, which includes electrode regions 411A, in the first array of receiver electrodes 416A, is coupled to the first group of receiver electrodes 414C, which include electrode regions 411A, in the third array of receiver electrodes 416C, using the trace 413AA. In general, the one or more groups of sensor electrodes in different sets of sensor electrode arrays can be connected together to reduce the number of traces and complexity of the processing system. In some embodiments, at least one electrode region in a first array of receiver electrodes is interconnected with at least one electrode region in a second array of receiver electrodes, which are disposed in the sensing region 120.

With reference to FIG. 5, the arrays of receiver electrodes 416A and 416B and arrays of receiver electrodes 416C and 416D, and their associated traces 413A-413B, are positioned near to each other (e.g., adjacent to each other). In this configuration, the arrays of receiver electrodes 416 and associated traces are positioned next to each other and are disposed between two or more arrays of transmitter electrodes 415. Thus, when the sensor electrode region 402H is driven for capacitive sensing, the trace 412H is positioned so that it will essentially not capacitively couple to the first sensor electrode region 411A or the second sensor electrode region 411B in the second array of receiver electrodes 416$_2$ or the first sensor electrode region 411A or the second sensor electrode region 411B in the first or third array of receiver electrodes 416$_1$ or 416$_3$.

Figure 6A:
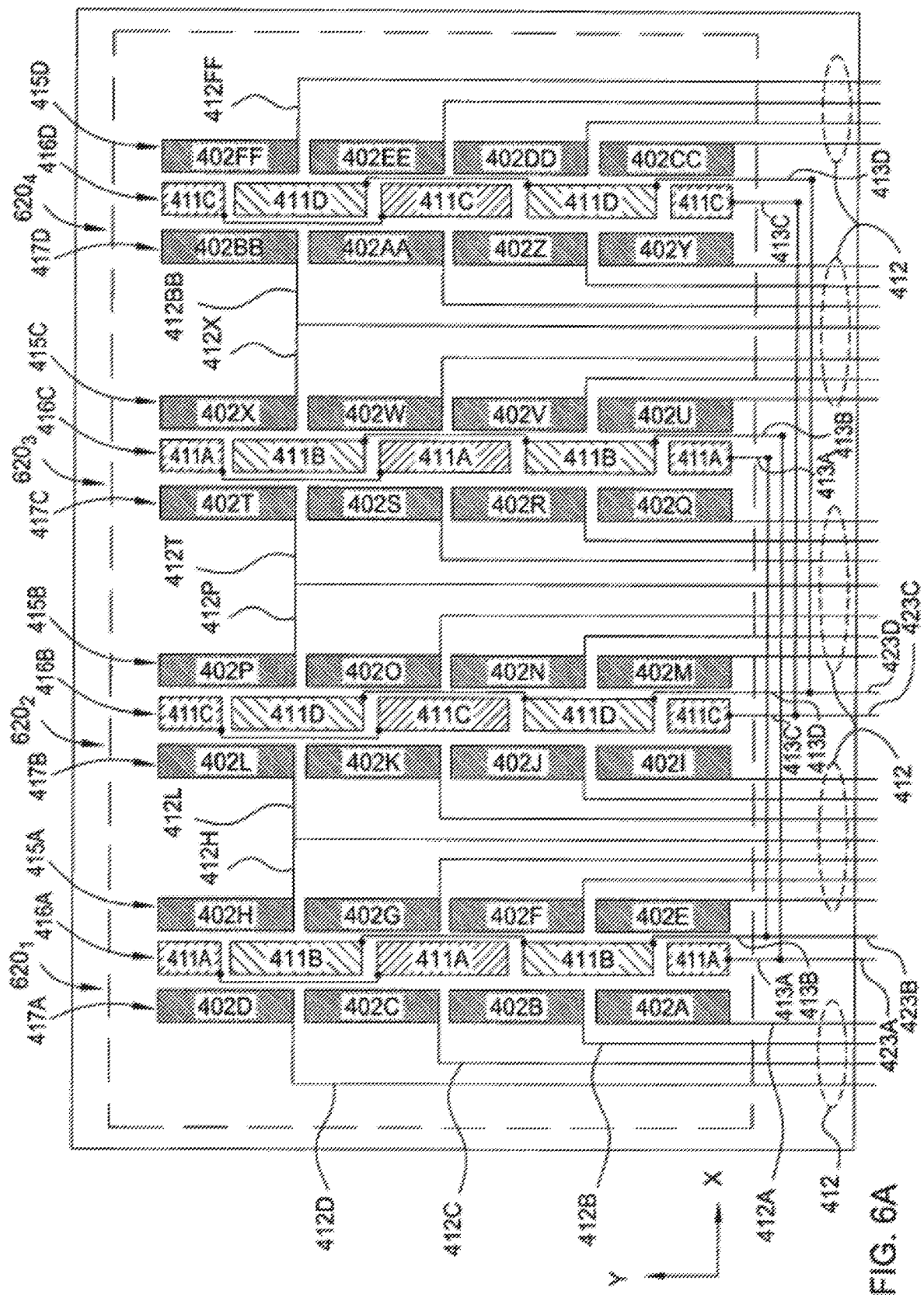
FIGS. 6A and 6B show single-layer sensor electrode configurations including four sets of sensor electrode arrays, in accordance with some other embodiments.

FIG. 6A shows a single-layer sensor electrode configuration including four sets of sensor electrode arrays, in accordance with some other embodiments. More specifically, in the example of FIG. 6A, each of the sets of sensor electrode arrays 620$_1$-620$_4$ include an array of receiver electrodes 416, and their associated traces 413A-413B or 413C-413D, that are positioned between array(s) of transmitter electrodes 415. In one example, a first set of sensor electrode arrays 620$_1$ includes three arrays of sensor electrodes, such as a first array of transmitter electrodes 415A, a first array of opposing transmitter electrodes 417A and a first array of receiver electrodes 416A.

Aspects of the present disclosure recognize that positioning an array of one type of sensing electrode between at least two arrays of another type of sensing electrodes (e.g., that form unique pixels), such as an array of receiving electrodes between two arrays of transmitter electrodes or vice versa, the physical orientation of the different types of sensor electrodes can help shield or minimize the cross-coupling of electrodes that are positioned a distance away from the set of electrode arrays, and thus prevent the mischaracterization the position of an input object when electrodes in two or more different sets of sensor electrode arrays are connected together. Further, positioning an array of one type of sensing electrode between at least two arrays of another type of sensing electrodes will create a symmetric electric field between the electrodes when the center electrode is driven relative to the two outer electrodes or the two outer electrodes are driven relative to the inner electrode, which may improve the quality of the capacitive sensing signal and process.

Figure 6B:
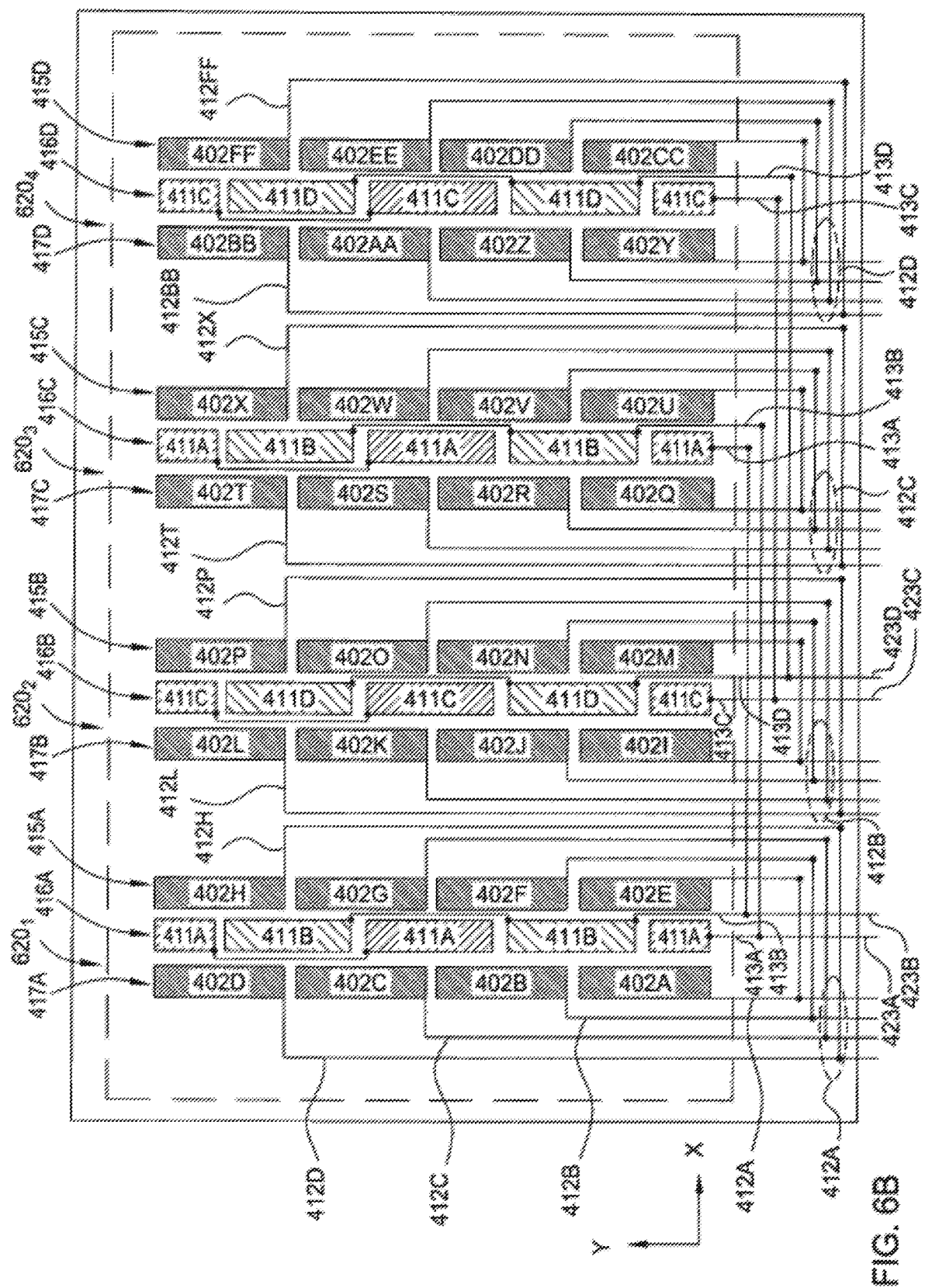

FIG. 6B show another single-layer sensor electrode configuration including four sets of sensor electrode arrays, in accordance with some other embodiments. More specifically, FIG. 6B illustrates an example electrode configuration that is formed in each of the sets of sensor electrode arrays 620$_1$-620$_4$ to create a symmetric electric field between pairs of opposing electrodes during operation of the input device. In this example, the electrodes 402 in the same row, such as electrodes 402D and 402H, electrodes 402L and 402P, electrodes 402C and 402G, etc. are each coupled together to form a symmetric electrode configuration relative to an opposing electrode 411.

It is noted that the number of traces 412 that need to be connected to the processing system components 110, in the example of FIG. 6B, is halved (compared to FIG. 6A) due to the interconnection of the electrodes 402 positioned in each row. In this configuration, only traces 412A-D are routed and connected to the processing system components, which is a smaller subset of the number of traces 412 shown in FIG. 6A. Further, when the electrodes 402 (e.g., electrodes 402D and 402H) are driven relative to the electrodes 411 (e.g., electrodes 411A and/or 411B), or vice versa, the electric fields created between each of the electrodes 402 and the centrally positioned electrode 411 will be symmetric. Thus, as noted above, the quality of the capacitive sensing signal may be improved and the cost and complexity of the input device can be reduced due to the reduction in the number of required traces and capacitive sensing channels.

As illustrated in FIGS. 6A and 6B, at least one electrode region in a first array of receiver electrodes in a first set of sensor electrode arrays is interconnected with at least one electrode region in a second array of receiver electrodes in a second set of sensor electrode arrays, which are all disposed in the sensing region 120. By positioning the arrays of receiver electrodes and their associated traces between two arrays of transmitter electrodes that are positioned to directly couple to the receiver electrodes in the array of receiving electrodes, the cross-coupling of the arrays of receiver electrodes and other non-directly coupled transmitter electrode regions is minimized. In one example, when the sensor electrode region 402L is driven for capacitive sensing, the trace 412L is positioned so that it will not capacitively couple to the first sensor electrode region 411A or the second sensor electrode region 411B in the first array of receiver electrodes 416A or the first sensor electrode region 411A or the second sensor electrode region 411B in the third array of receiver electrodes 416C.

In some embodiments, two or more traces may be coupled together within the sensing region 120 to further reduce the number of connections that are required to make to the processing system 110 components. For example, as illustrated in FIG. 6A, the traces 402H and 402L, 402P and 402T, and 402X and 402BB may be connected together to reduce the number of traces 412 that are required to connect the electrode regions to the processing system components. In this example, the total number of required traces 412 that are coupled to the processing components can be reduced by four traces.

Figure 7:
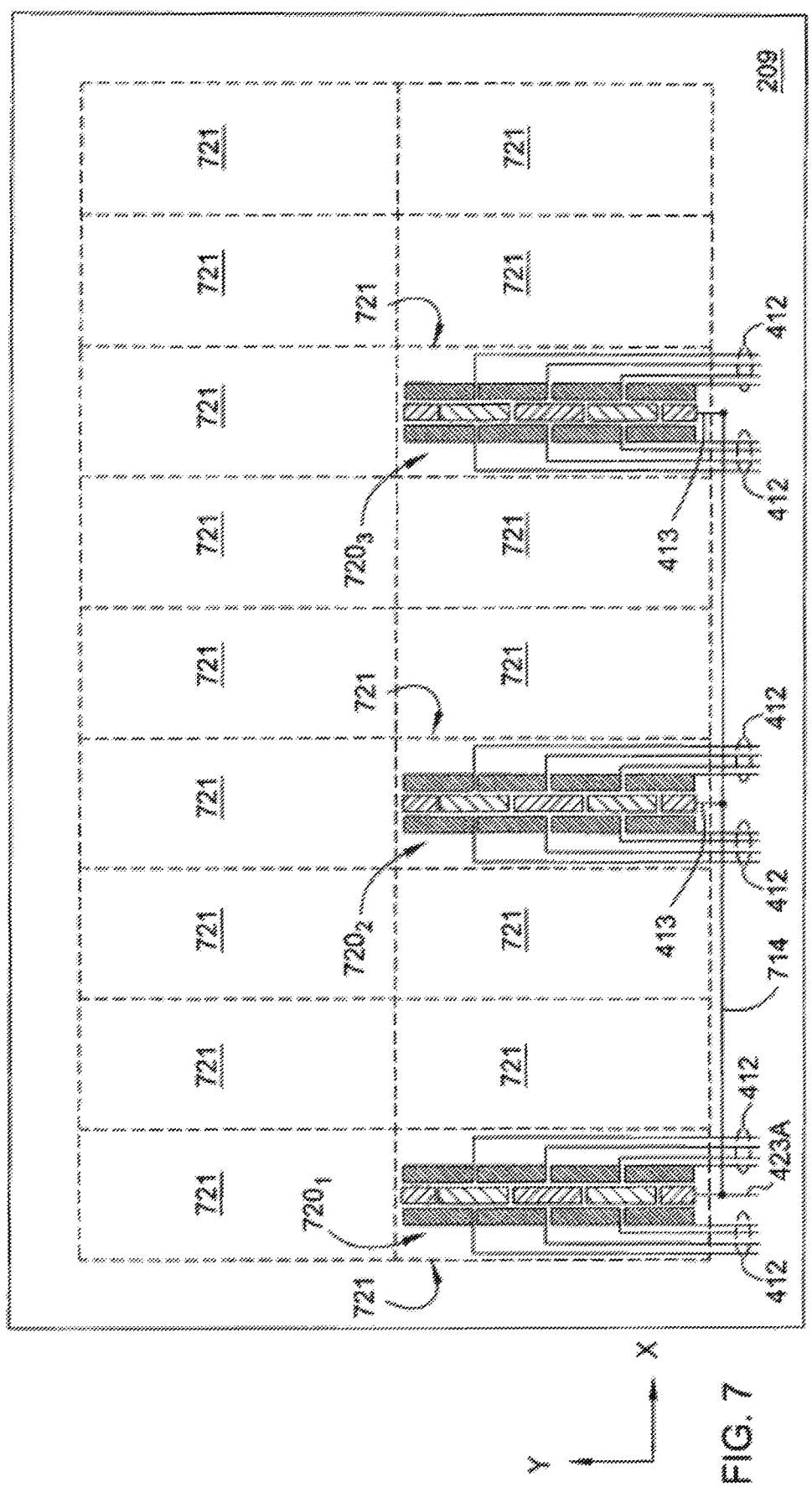
FIG. 7 shows an example sensor configuration of a sensing region, in accordance with some embodiments.
Figure 8:
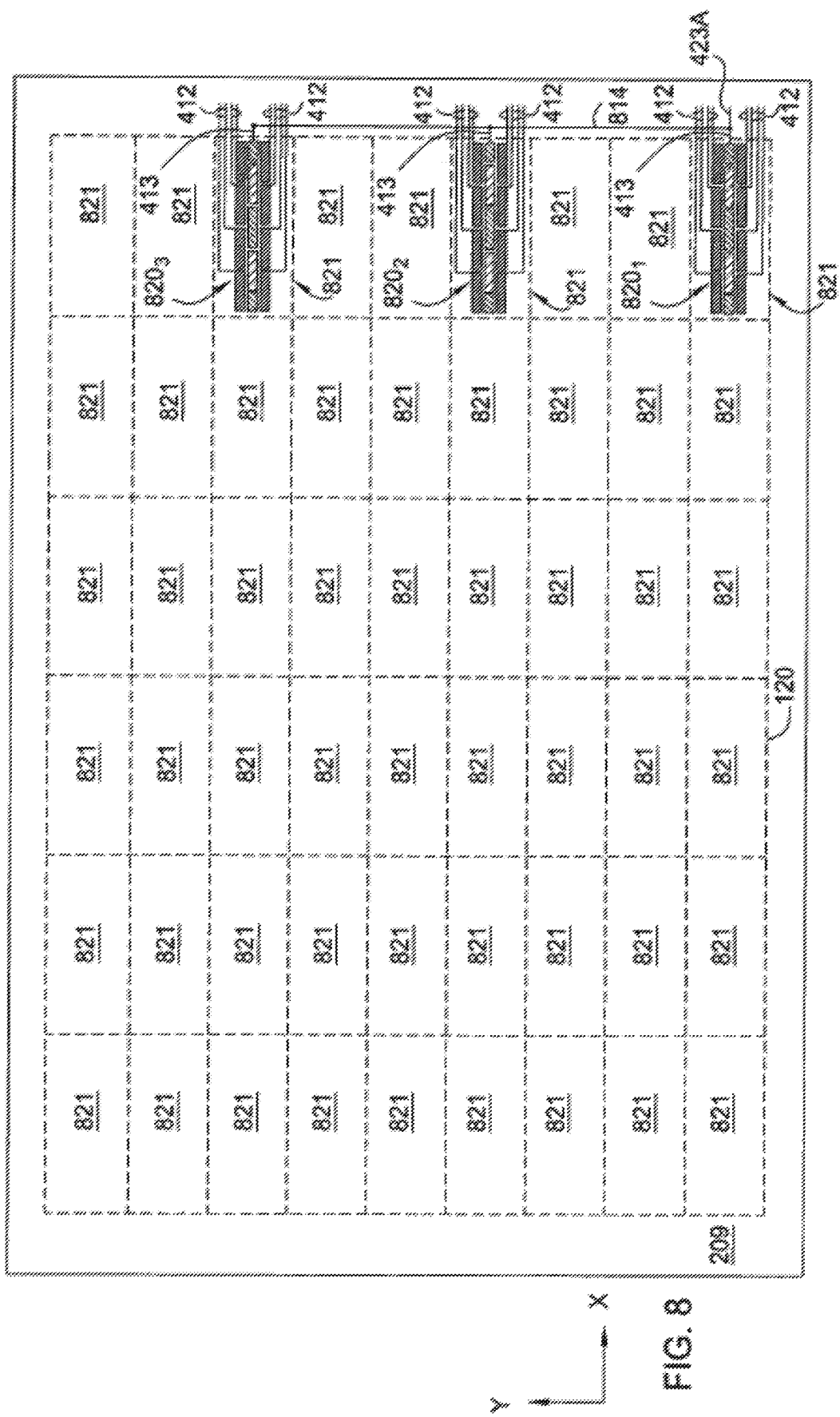
FIG. 8 shows another example sensor configuration of a sensing region, in accordance with some embodiments.

FIGS. 7 and 8 illustrate a sensing region 120 of an input device 100 that is divided up into sectors 721 or 821 that are each configured to contain at least one set of sensor electrode arrays. For clarity of discussion, only three of the sectors 721 in FIG. 7 and three of the sectors 821 in FIG. 8 have a set of sensor electrode arrays shown therein. However, one skilled in the art will appreciate that each of the sectors 721 shown in FIGS. 7 and 8 could have at least one set of sensor electrode arrays disposed therein. Moreover, at least one electrode in each of these sets of sensor electrode arrays could be coupled with one or more electrodes in another set of sensor electrode arrays disposed in the same sector or other sectors within the sensing region 120. These electrode configurations may also include multiple arrays of capacitive pixels that each includes unique pairs of sensor electrodes.

As illustrated in FIG. 7, three sets of sensor electrode arrays $720_1$-$720_3$, which are positioned three sectors 721 away from each other, are coupled together to reduce the total number of traces (e.g., traces 412 and 413) that need to be connected to the processing system components (not shown). In this example, at least one electrode in each of the horizontally oriented three sets of sensor electrode arrays are coupled together using an interconnect 714 that is coupled to the traces 413 (e.g., trace 413A in FIG. 6A) in each set of sensor electrode arrays to reduce the number of traces (e.g., traces 412 and/or 423) that are required to connect each of the sensor electrode regions to the processing system components. Sectors on either side of the substrate 209 (e.g. left and right in the X-direction or top and bottom in the Y-direction) may be routed to their nearby edges or outside of the viewable area (e.g. Active Area) of the display, thereby reducing the required routing width and parasitic capacitive coupling.

As illustrated in FIG. 8, three sets of sensor electrode arrays $820_1$-$820_3$, which are positioned three sectors 821 away from each other, are coupled together to reduce the total number of traces that need to be connected to the processing system components (not shown). In this example, at least one electrode in each of the three vertically oriented sets of sensor electrode arrays are coupled together using an interconnect 814 that is coupled to the traces 413 (e.g., trace 413A in FIG. 6A) in each set of sensor electrode arrays to reduce the number of traces (e.g., traces 412 and/or 423) that are required to connect each of the sensor electrode regions to the processing system components.

With reference to FIGS. 6A, 6B, 7 and 8, it is noted that the number of traces may be further reduced, while still achieving a symmetric electric field, by alternating the columns of transmit and receive electrodes, and grouping the sensor electrodes, such that at least one receive (or transmit) electrode is disposed between two transmit (or receive) electrodes that operate concurrently in each group. As described above, in conventional capacitive sensing applications, the array of sensor electrodes is scanned progressively (e.g., row-by-row) to generate a capacitive image. However, when multiple receive (RX) electrodes are capacitively coupled to each transmit (TX) electrode, the number of different RX channels needed to process a single row of the sensor array grows significantly relative to the number of TX electrodes in each row. Thus, it may be desirable to reduce the granularity of the scanning operation so that localized groups of TX electrodes can be activated at a time, without having to activate an entire row of the sensor array at once.

Figure 9:
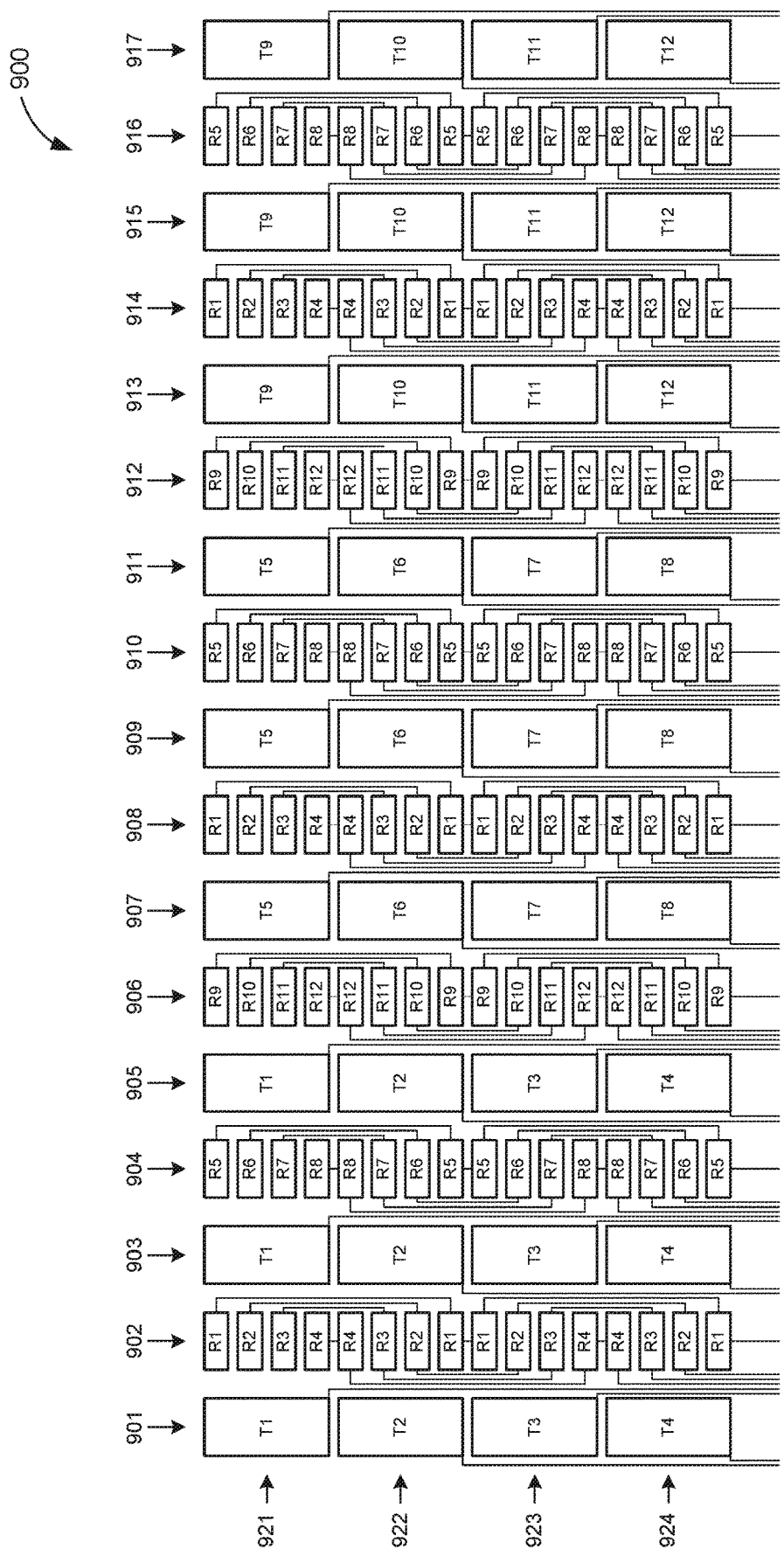
FIG. 9 shows a single-layer capacitive sensing array, in accordance with some other embodiments.

FIG. 9 shows a capacitive sensing array 900, in accordance with some other embodiments. In the example of FIG. 9, a plurality of sensor electrodes T1-T12 and R1-R12 are arranged in rows 921-924 and columns 901-917 in a single-layer or coplanar configuration. For purposes of discussion, the larger electrodes T1-T12 are referred to as TX electrodes and the smaller electrodes R1-R12 are referred to as RX electrodes. However, in actual implementations, any of the larger electrodes T1-T12 may perform the functions of RX electrodes and any of the smaller electrodes R1-R12 may perform the functions of TX electrodes. TX electrodes with the same electrode number (e.g., T1, T2, T3, etc.) may be coupled to the same TX channel and RX electrodes with the same electrode number (e.g., R1, R2, R3, etc.) may be coupled to the same RX channel. Thus, in the example of FIG. 9, the capacitive sensing array 900 includes 12 different TX channels and 12 different RX channels.

In some embodiments, the TX electrodes (and RX electrodes) are arranged in localized groups. For example, a group of first TX electrodes (T1) is disposed in columns 901, 903, and 905 of the first row 921 of the array 900. The T1 electrodes may be coupled to a first TX channel, and may thus be driven at the same time (e.g., concurrently) when the first TX channel is activated during a scan of the capacitive sensing array 900. Each of the T1 electrodes is adjacent to at least four RX electrodes R1-R4, R5-R8, and R9-R12 disposed in columns 902, 904, and 906, respectively, of row 921. Thus, when the first TX channel is activated, the RX electrodes R1-R12 may detect a unique capacitive coupling from the adjacent T1 electrodes. More specifically, the RX electrodes R1-R4 in column 902 may detect a symmetric electric field (e.g., produced by the T1 electrodes in columns 901 and 903) and the RX electrodes R5-R8 may also detect a symmetric electric field (e.g., produced by the T1 electrodes in columns 903 and 905).

A group of second TX electrodes (T2) is disposed in columns 901, 903, and 905 of the second row 922 of the array 900. The T2 electrodes may be coupled to a second TX channel, and may thus be driven at the same time when the second TX channel is activated. Each of the T2 electrodes is adjacent to at least four RX electrodes R1-R4, R5-R8, and R9-R12 disposed in columns 902, 904, and 906, respectively, of row 922. Thus, when the second TX channel is activated, the RX electrodes R1-R12 may detect a unique capacitive coupling from the adjacent T2 electrodes. As shown in FIG. 9, the order of the RX electrodes in a given column is reversed for each successive row. For example, the R4 electrode adjacent to T1 is at the bottom of row 921, whereas the R4 electrode adjacent to T2 is at the top of row 922. Accordingly, spill-over electric field emitted by T1 may be detected by R4 in row 922 and combined with the electric field detected by R4 in row 921. Similarly, spill-over electric field emitted by T2 may be detected by R4 in row 921 and combined with the electric field detected by R4 in row 921.

In the embodiment of FIG. 9, the T1 and T2 electrodes do not span the entire rows 921 and 922, respectively, of the array 900. Thus, the RX channels may be repeated (or reused) beginning at column 908. This allows the number of RX channels to be limited to 12. For example, a group of fifth TX electrodes (T5) is disposed in columns 907, 909, and 911 of the first row 921. Each of the T1 electrodes is adjacent to eight RX electrodes R9-R12, R1-R4, R5-R8, and R9-R12 disposed in columns 906, 908, 910, and 912, respectively, of row 921. Thus, when the fifth TX channel is activated, the RX electrodes R1-R12 may detect a capacitive coupling from the adjacent T5 electrodes. In contrast, if the entire first row 921 of TX electrodes (e.g., in columns 901, 903, 905, 907, 909, 911, 913, 915, and 917) were driven concurrently, the input device would require 32 different RX channels to uniquely detect an input object.

Aspects of the present disclosure recognize that, when the T5 electrodes are driven, the RX electrodes R9-R12 in column 906 and in column 912 of row 921 may simultaneously detect changes in capacitive coupling with adjacent T5 electrodes in columns 97 and 911, respectively. As a result, the processing system of the input device may be unable to uniquely identify the location of an input object in columns 906 or 912 of the array 900. For example, when the R9 electrode in column 906 senses a change in capacitance (e.g., exceeding a threshold amount), the change in capacitance may register on the ninth RX channel at the receiver (e.g., the channel associated with all R9 electrodes in the array). As a result, the processing system may be unable to discern whether an input object was detected by the R9 electrode in column 906 or the R9 electrode in column 912, or both. Thus, in some embodiments, it may be desirable to alter the configuration of RX electrodes at the edges or borders of different TX groups.

Figure 10:
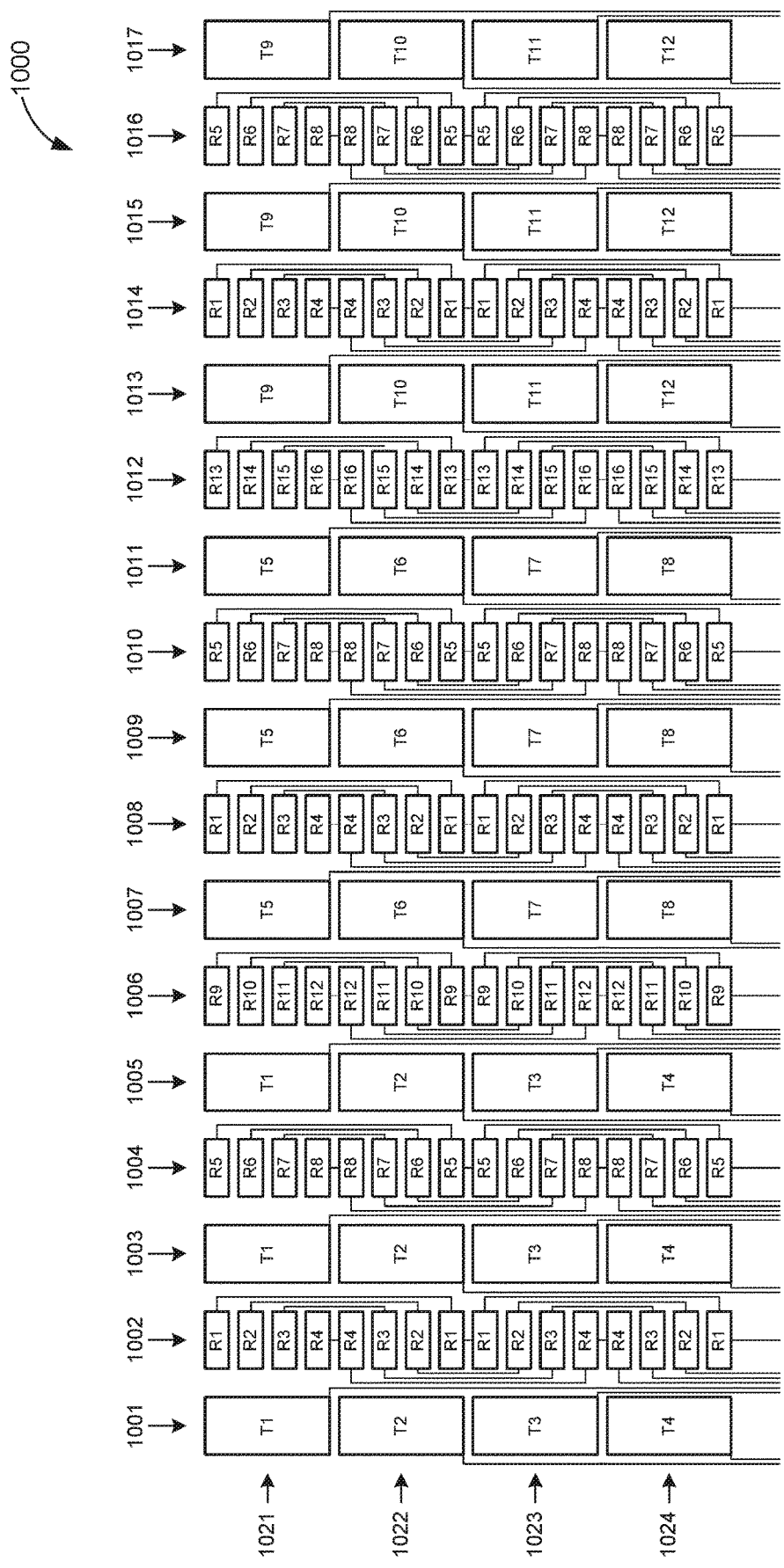
FIG. 10 shows a single-layer capacitive sensing array with a unique mapping of transmit and receive channels, in accordance with some embodiments.

FIG. 10 shows a single-layer capacitive sensing array 1000 with a unique mapping of transmit and receive channels, in accordance with some embodiments. In the example of FIG. 10, a plurality of sensor electrodes T1-T12 and R1-R16 are arranged in rows 1021-1024 and columns 1001-1017 in a single-layer or coplanar configuration. For purposes of discussion, the larger electrodes T1-T12 are referred to as TX electrodes and the smaller electrodes R1-R16 are referred to as RX electrodes. However, in actual implementations, any of the larger electrodes T1-T12 may perform the functions of RX electrodes and any of the smaller electrodes R1-R16 may perform the functions of TX electrodes. TX electrodes with the same electrode number (e.g., T1, T2, T3, etc.) may be coupled to the same TX channel and RX electrodes with the same electrode number (e.g., R1, R2, R3, etc.) may be coupled to the same RX channel. Thus, in the example of FIG. 10, the capacitive sensing array 1000 includes 12 different TX channels and 16 different RX channels.

In some embodiments, the TX electrodes (and RX electrodes) are arranged in localized groups. For example, a group of first TX electrodes (T1) is disposed in columns 1001, 1003, and 1005 of the first row 1021 of the array 1000. As described above, the T1 electrodes may be coupled to a first TX channel and may thus be driven at the same time (e.g., concurrently) when the first TX channel is activated during a scan of the capacitive sensing array 1000. Each of the T1 electrodes is adjacent to at least four RX electrodes R1-R4, R5-R8, and R9-R12 disposed in columns 1002, 1004, and 1006, respectively, of row 1021. Thus, when the first TX channel is activated, the RX electrodes R1-R12 may detect a unique capacitive coupling from the adjacent T1 electrodes.

A group of second TX electrodes (T2) is disposed in columns 1001, 1003, and 1005 of the second row 1022 of the array 1000. The T2 electrodes may be coupled to a second TX channel, and may thus be driven at the same time when the second TX channel is activated. Each of the T2 electrodes is adjacent to at least four RX electrodes R1-R4, R5-R8, and R9-R12 disposed in columns 1002, 1004, and 1006, respectively, of row 1022. Thus, when the second TX channel is activated, the RX electrodes R1-R12 may detect a unique capacitive coupling from the adjacent T2 electrodes. As shown in FIG. 10, the order of the RX electrodes in a given column is reversed for each successive row. For example, the R4 electrode adjacent to T1 is at the bottom of row 1021, whereas the R4 electrode adjacent to T2 is at the top of row 1022.

Further, a group of fifth TX electrodes (T5) is disposed in columns 1007, 1009, and 1011 of the first row 1021. Each of the T5 electrodes is adjacent to eight RX electrodes R9-R12, R1-R4, R5-R8, and R13-R16 disposed in columns 1006, 1008, 1010, and 1012, respectively, of row 1021. Thus, when the T5 electrodes are driven, the RX electrodes R1-R16 may detect a unique capacitive coupling from the adjacent T5 electrodes. Because none of the RX electrodes adjacent to the T5 electrodes are reused or repeated, and because the RX electrodes R13-R16 on the right-most edge (e.g., column 1012) of the T5 group of electrodes are coupled to different RX channels than the RX electrodes R9-R12 on the left-most edge (e.g., column 1006) of the T5 group, each of the RX channels will detect a unique capacitive coupling between the RX electrodes R1-R16 and adjacent T5 electrodes.

Thus, by increasing the number of RX channels by 4 (compared to the sensor configuration 900 of FIG. 9), the sensor configuration 1000 may uniquely identify input objects at any position within the sensing region. More generally, assuming a maximum number (m) of TX electrodes in each TX group and a number (n) of RX electrodes disposed between each pair of TX electrodes in the sensor array, the total number of distinct RX channels in the sensor electrode configuration 1000 is equal to n+n*m. With reference for example to FIG. 10, there are 3 TX electrodes in each group (m=3) and 4 RX electrodes adjacent to each TX electrode (n=4). Thus, the total number of RX channels is equal to 4+3*4=16.

As described above, parasitic capacitances may affect the capacitive coupling between TX electrodes and RX electrodes. In particular, a parasitic background capacitance (e.g., from display electrodes or other circuitry disposed on or adjacent to the input device) may persist each time the sensor electrodes are scanned. As a result, the parasitic background capacitance may affect the charge accumulated in the receiver across each of the RX channels (e.g., for respective RX electrodes R1-R16). However, in the example of FIG. 10, there is an unequal distribution of RX electrodes R1-R16. More specifically, there are triple the number of RX electrodes R1-R8 as RX electrodes R9-R12 or R13-R16. This may result in an imbalance in background capacitances detected across the different RX channels. For example, the first eight RX channels (e.g., coupled to RX electrodes R1-R8) may sense three times the amount of background capacitance as any of the last eight RX channels (e.g., coupled to RX electrodes R9-R16) each time the sensor electrodes are scanned. This imbalance in capacitive background coupling may lead to errors in input detection at various points in the sensing region.

Figure 11:
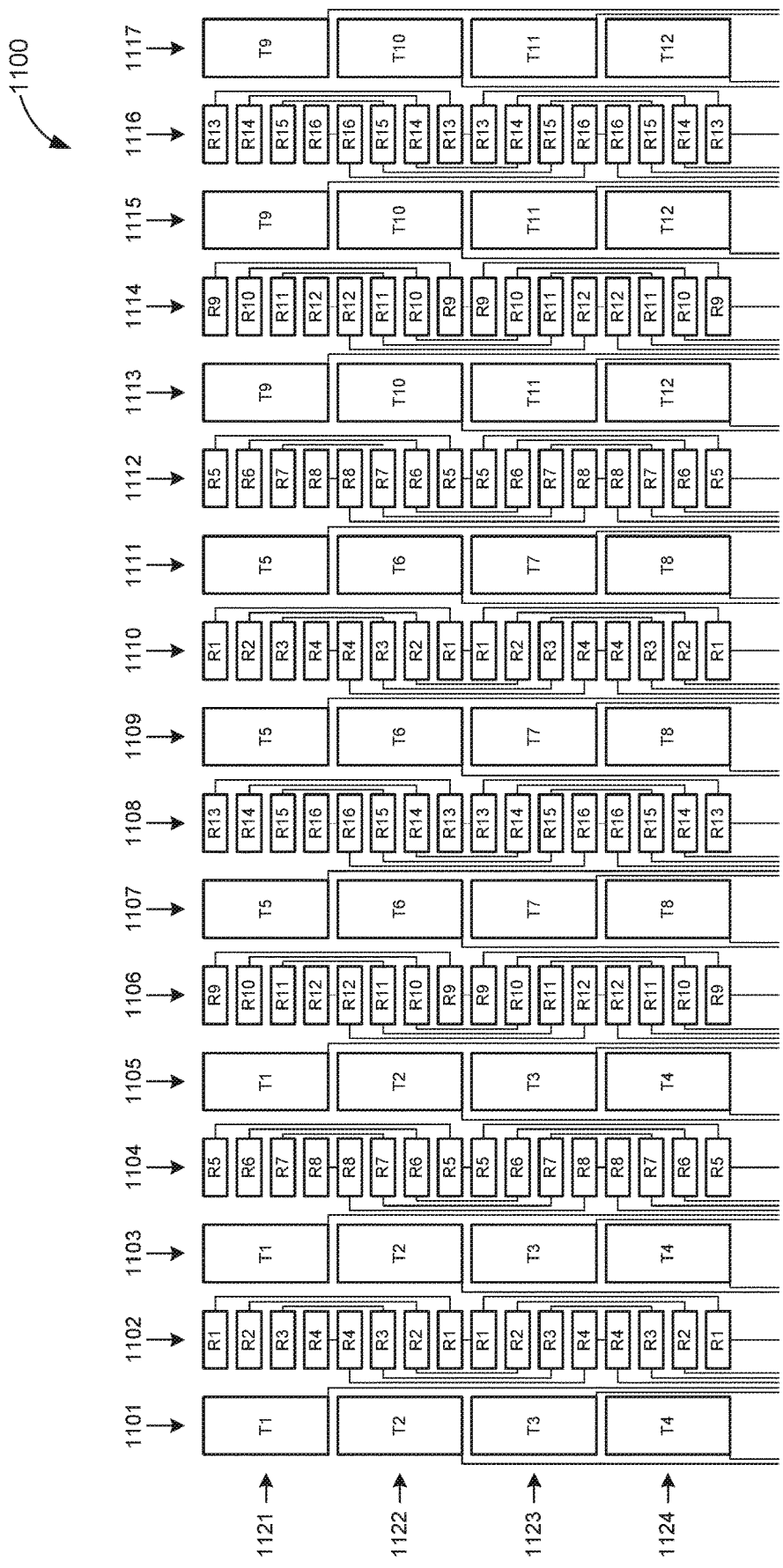
FIG. 11 shows a single-layer capacitive sensing array with balanced capacitive background coupling, in accordance with some embodiments.

FIG. 11 shows a single-layer capacitive sensing array 1100 with balanced capacitive background coupling, in accordance with some embodiments. In the example of FIG. 11, a plurality of sensor electrodes T1-T12 and R1-R16 are arranged in rows 1121-1124 and columns 1101-1117 in a single-layer or coplanar configuration. For purposes of discussion, the larger electrodes T1-T12 are referred to as TX electrodes and the smaller electrodes R1-R16 are referred to as RX electrodes. However, in actual implementations, any of the larger electrodes T1-T12 may perform the functions of RX electrodes and any of the smaller electrodes R1-R16 may perform the functions of TX electrodes. TX electrodes with the same electrode number (e.g., T1, T2, T3, etc.) may be coupled to the same TX channel and RX electrodes with the same electrode number (e.g., R1, R2, R3, etc.) may be coupled to the same RX channel. Thus, in the example of FIG. 11, the capacitive sensing array 1100 includes 12 different TX channels and 16 different RX channels.

In some embodiments, the TX electrodes (and RX electrodes) are arranged in localized groups. For example, a group of first TX electrodes (T1) is disposed in columns 1101, 1103, and 1105 of the first row 1121 of the array 1100. As described above, the T1 electrodes may be coupled to a first TX channel and may thus be driven at the same time (e.g., concurrently) when the first TX channel is activated during a scan of the capacitive sensing array 1100. Each of the T1 electrodes is adjacent to at least four RX electrodes R1-R4, R5-R8, and R9-R12 disposed in columns 1102, 1104, and 1106, respectively, of row 1121. Thus, when the first TX channel is activated, the RX electrodes R1-R12 may detect a unique capacitive coupling from the adjacent T1 electrodes.

A group of second TX electrodes (T2) is disposed in columns 1101, 1103, and 1105 of the second row 1122 of the array 1100. The T2 electrodes may be coupled to a second TX channel, and may thus be driven at the same time when the second TX channel is activated. Each of the T2 electrodes is adjacent to at least four RX electrodes R1-R4, R5-R8, and R9-R12 disposed in columns 1102, 1104, and 1106, respectively, of row 1122. Thus, when the second TX channel is activated, the RX electrodes R1-R12 may detect a unique capacitive coupling from the adjacent T2 electrodes. As shown in FIG. 11, the order of the RX electrodes in a given column is reversed for each successive row. For example, the R4 electrode adjacent to T1 is at the bottom of row 1121, whereas the R4 electrode adjacent to T2 is at the top of row 1122

Further, a group of fifth TX electrodes (T5) is disposed in columns 1107, 1109, and 1111 of the first row 1121. Each of the T5 electrodes is adjacent to eight RX electrodes R9-R12, R13-R16, R1-R4, and R5-R8 disposed in columns 1106, 1108, 1110, and 1112, respectively, of row 1121. Thus, when the T5 electrodes are driven, the RX electrodes R1-R16 may detect a unique capacitive coupling from the adjacent T5 electrodes. Because none of the RX electrodes adjacent to the T5 electrodes are reused or repeated, and because the RX electrodes R5-R8 on the right-most edge (e.g., column 1112) of the T5 group of electrodes is different than the RX electrodes R9-R12 on the left-most edge (e.g., column 1106) of the T5 group, each of the RX channels R1-R16 will detect a unique capacitive coupling with adjacent T5 electrodes.

As shown in FIG. 11, the configuration of RX electrodes in column 1108 is substantially different than the configuration of RX electrodes in column 1008 of FIG. 10. Specifically, rather than reuse the first four RX electrodes R1-R4 at the start of the next TX group (e.g., as shown in FIG. 10), the last four RX electrodes R13-R16 are disposed, instead, in column 1108. Further, a particular group of RX electrodes (such as the RX electrodes R1-R4 in column 1102) may be reused (e.g., in column 1108) only after each of the remaining groups of RX electrodes has been disposed in the intervening columns (such as the RX electrodes R5-58 and R13-R16 in columns 1104 and 1106, respectively). Thus, in some embodiments, the per-column grouping of RX electrodes (e.g., R1-R4 followed by R5-R8 followed by R9-R12 followed by R13-R16) may be repeated in this manner until the very last column of TX electrodes is reached (e.g., column 1117 in FIG. 11).

Moreover, in the example of FIG. 11, there is an equal distribution of RX electrodes R1-R16. In other words, there is an equal number of each of the RX electrodes R1-R16 evenly distributed across the sensor array. As a result, the background capacitances detected across the different RX channels will be balanced. For example, each of the RX channels may sense the same amount of background capacitance each time the sensor electrodes are scanned.

Figure 12:
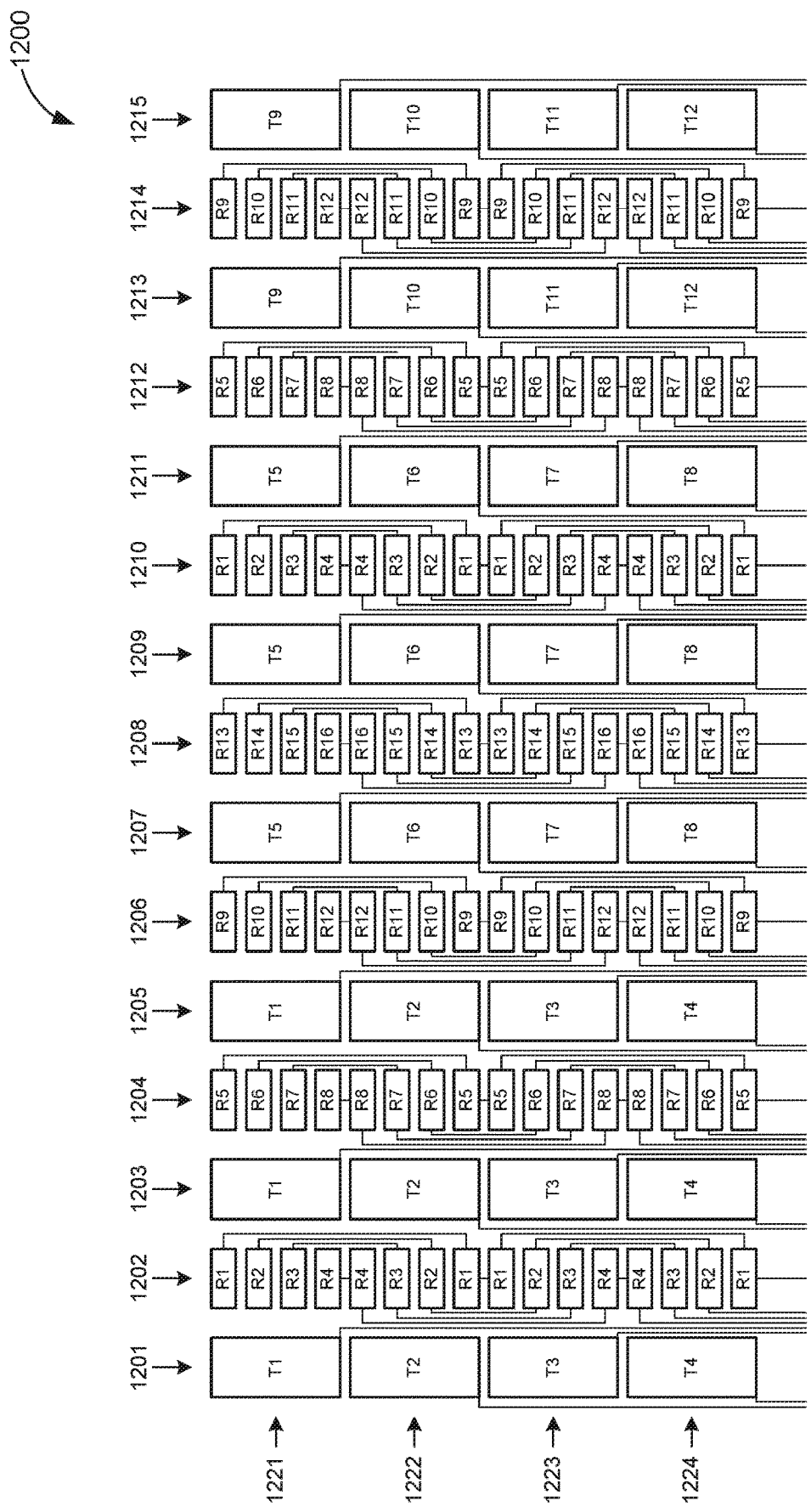
FIG. 12 shows a single-layer capacitive sensing array with relatively balanced capacitive background coupling, in accordance with some embodiments.

FIG. 12 shows a single-layer capacitive sensing array 1200 with relatively balanced capacitive background coupling, in accordance with some embodiments. In the example of FIG. 12, a plurality of sensor electrodes T1-T12 and R1-R16 are arranged in rows 1221-1224 and columns 1201-1217 in a single-layer or coplanar configuration. For purposes of discussion, the larger electrodes T1-T12 are referred to as TX electrodes and the smaller electrodes R1-R16 are referred to as RX electrodes. However, in actual implementations, any of the larger electrodes T1-T12 may perform the functions of RX electrodes and any of the smaller electrodes R1-R16 may perform the functions of TX electrodes. TX electrodes with the same electrode number (e.g., T1, T2, T3, etc.) may be coupled to the same TX channel and RX electrodes with the same electrode number (e.g., R1, R2, R3, etc.) may be coupled to the same RX channel. Thus, in the example of FIG. 12, the capacitive sensing array 1200 includes 12 different TX channels and 16 different RX channels.

In some embodiments, the TX electrodes (and RX electrodes) are arranged in localized groups. For example, a group of first TX electrodes (T1) is disposed in columns 1201, 1203, and 1205 of the first row 1221 of the array 1200. As described above, the T1 electrodes may be coupled to a first TX channel and may thus be driven at the same time (e.g., concurrently) when the first TX channel is activated during a scan of the capacitive sensing array 1200. Each of the T1 electrodes is adjacent to at least four RX electrodes R1-R4, R5-R8, and R9-R12 disposed in columns 1202, 1204, and 1206, respectively, of row 1221. Thus, when the first TX channel is activated, the RX electrodes R1-R12 may detect a unique capacitive coupling from the adjacent T1 electrodes.

A group of second TX electrodes (T2) is disposed in columns 1201, 1203, and 1205 of the second row 1222 of the array 1200. The T2 electrodes may be coupled to a second TX channel, and may thus be driven at the same time when the second TX channel is activated. Each of the T2 electrodes is adjacent to at least four RX electrodes R1-R4, R5-R8, and R9-R12 disposed in columns 1202, 1204, and 1206, respectively, of row 1222. Thus, when the second TX channel is activated, the RX electrodes R1-R12 may detect a unique capacitive coupling from the adjacent T2 electrodes. As shown in FIG. 12, the order of the RX electrodes in a given column is reversed for each successive row. For example, the R4 electrode adjacent to T1 is at the bottom of row 1221, whereas the R4 electrode adjacent to T2 is at the top of row 1222

Further, a group of fifth TX electrodes (T5) is disposed in columns 1207, 1209, and 1211 of the first row 1221. Each of the T5 electrodes is adjacent to eight RX electrodes R9-R12, R13-R16, R1-R4, and R5-R8 disposed in columns 1206, 1208, 1210, and 1212, respectively, of row 1221. Thus, when the T5 electrodes are driven, the RX electrodes R1-R16 may detect a unique capacitive coupling from the adjacent T5 electrodes. Because none of the RX electrodes adjacent to the T5 electrodes are reused or repeated, and because the RX electrodes R5-R8 on the right-most edge (e.g., column 1212) of the T5 group of electrodes is different than the RX electrodes R9-R12 on the left-most edge (e.g., column 1206) of the T5 group, each of the RX channels R1-R16 will detect a unique capacitive coupling with adjacent T5 electrodes.

In the example of FIG. 12, the per-column grouping of RX electrodes is similar to that of FIG. 11. In other words, a particular group of RX electrodes (such as the RX electrodes R1-R4 in column 1202) may be reused (e.g., in column 1208) only after each of the remaining groups of RX electrodes has been disposed in the intervening columns (such as the RX electrodes R5-58 and R13-R16 in columns 1204 and 1206, respectively). However, there is an even number (8) of columns of TX electrodes 1201, 1203, 1205, 1207, 1209, 1211, 1213, and 1215. More specifically, in contrast with FIG. 11, each of the last four groups of TX electrodes (T9-T12) includes only two TX electrodes instead of the three. As a result, the last group of RX electrodes R13-R16 is not reused or repeated in the sensor electrode configuration 1200.

Although there is an unequal distribution of RX electrodes R1-R16, the capacitive background coupling remains relatively balanced in some embodiments. For example, the first twelve RX channels (coupled to RX electrodes R1-R12) may sense twice the amount of background capacitance as the last four RX channels (coupled to RX electrodes R13-R16). Aspects of the present disclosure recognize that the imbalance in capacitive background coupling here is still significantly less than the imbalance resulting from the sensor electrode configuration 1000 (e.g., where the first eight RX channels sense three times the amount of background capacitance as any of the last eight RX channels).

Figure 13:
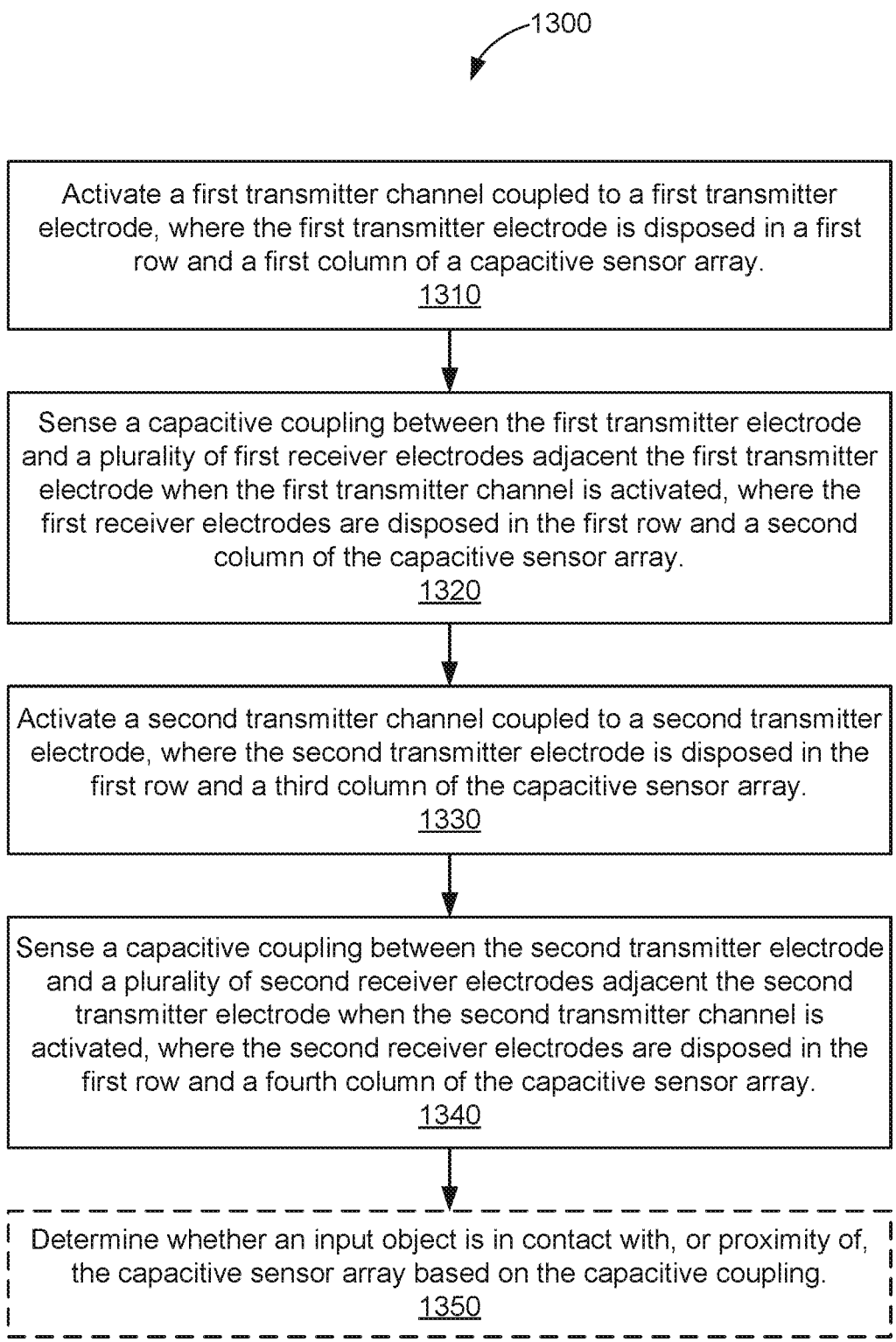
FIG. 13 is an illustrative flowchart depicting an example capacitive sensing operation, in accordance with some embodiments.

FIG. 13 is an illustrative flowchart depicting an example capacitive sensing operation 1300, in accordance with some embodiments. With reference for example to FIG. 1, the operation 1300 may be performed by the processing system 110 to scan the array of sensing elements 121 for a presence of input objects.

The processing system may activate a first transmitter channel coupled to a first transmitter electrode, where the first transmitter electrode is disposed in a first row and a first column of a capacitive sensor array (1310). With reference for example to FIGS. 9-12, each transmitter electrode may be coupled to a particular TX channel. The processing system may activate the first transmitter channel by driving a sensing signal on the TX channel coupled to the first transmitter electrode. In some embodiments, a group of TX electrodes may be coupled to the same TX channel as the first TX electrode. Thus, by driving a sensing signal onto the TX channel, the processing system may activate one or more additional TX electrodes concurrently with the first TX electrode.

The processing system senses a capacitive coupling between the first transmitter electrode and a plurality of first receiver electrodes adjacent the first transmitter electrode when the first transmitter channel is activated, where the first receiver electrodes are disposed in the first row and a second column of the capacitive sensor array (1320). With reference for example to FIGS. 9-12, each of the first receiver electrodes may be coupled to a respective RX channel. In some embodiments, the RX channels may be reused or repeated for different TX groups (e.g., in a given row the array). More generally, assuming a maximum number (m) of TX electrodes in each TX group and a number (n) of RX electrodes disposed between each pair of TX electrodes in the sensor array, the total number of distinct RX channels in the sensor electrode configuration 1000 is equal to n+n*m.

The processing system may further activate a second transmitter channel coupled to a second transmitter electrode, where the second transmitter electrode is disposed in the first row and a third column of the capacitive sensor array (1330). With reference for example to FIGS. 9-12, the second transmitter electrode may be coupled to a different TX channel than the first transmitter electrode. The processing system may activate the second transmitter channel by driving a sensing signal on the TX channel coupled to the second transmitter electrode. In some embodiments, a group of TX electrodes may be coupled to the same TX channel as the second TX electrode. Thus, by driving a sensing signal onto the TX channel, the processing system may concurrently activate one or more TX electrodes in addition to the second TX electrode.

The processing system senses a capacitive coupling between the second transmitter electrode and a plurality of second receiver electrodes adjacent the second transmitter electrode when the second transmitter channel is activated, where the second receiver electrodes are disposed in the first row and a fourth column of the capacitive sensor array (1340). With reference for example to FIGS. 9-12, the second receiver electrodes may be coupled to the same RX channels as the first receiver electrodes. In other words, the second receiver electrodes may be reused or repeated to detect capacitive couplings with the second transmitter electrode. However, because each group of TX electrodes is coupled to a different TX channel, the RX channels may detect a unique capacitive coupling between the activated TX electrodes and adjacent RX electrodes in any portion of the array.

In some embodiments, the RX electrodes disposed on the left-most edge of the TX group (which includes all TX electrodes coupled to the second TX channel) may be coupled to different RX channels than the RX electrodes disposed on the right-most edge of the TX group, such as described with respect to FIG. 10. In some other embodiments, a particular group of RX electrodes (such as the RX electrodes R1-R4 in column 1102 of FIG. 11) may be reused (e.g., in column 1108) only after each of the remaining groups of RX electrodes has been disposed in the intervening columns, such as described with respect to FIG. 11.

In some embodiments, the processing system may further determine whether an input object is in contact with, or proximity of, the capacitive sensor array based on the capacitive coupling (1350). For example, an object in contact with (or close proximity of) the capacitive sensor array may cause changes in the capacitive coupling between local TX and RX electrodes. In some aspects, the processing system may sense the presence of one or more input objects using absolute capacitance sensing techniques. In some other aspects, the processing system may sense the presence of one or more input objects using transcapacitance sensing techniques. In some embodiments, the processing system may further correct for parasitic couplings between user inputs and routing traces (e.g. by linear corrections, iterative estimation, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A capacitive sensor array, comprising:
    a first transmitter electrode coupled to a first transmitter channel and disposed in a first row and a first column of the capacitive sensor array;
    a plurality of first receiver electrodes disposed, adjacent the first transmitter electrode, in the first row and a second column of the capacitive sensor array, wherein each of the first receiver electrodes is coupled to a respective one of a plurality of first receiver channels;
    a second transmitter electrode coupled to a second transmitter channel and disposed in the first row and a third column of the capacitive sensor array;
    a plurality of second receiver electrodes disposed, adjacent the second transmitter electrode, in the first row and a fourth column of the capacitive sensor array, wherein each of the second receiver electrodes is coupled to a respective one of the first receiver channels;
    a third transmitter electrode coupled to the first transmitter channel and disposed in the first row and a fifth column of the capacitive sensor array; and
    a plurality of third receiver electrodes disposed, adjacent the third transmitter electrode, in the first row and a sixth column of the capacitive sensor array, wherein each of the third receiver electrodes is coupled to a respective one of a plurality of second receiver channels.

2. The capacitive sensor array of claim 1, wherein the plurality of first receiver channels are configured to:
    sense a capacitive coupling between the first transmitter electrode and the plurality of first receiver electrodes when the first transmitter channel is activated; and
    sense a capacitive coupling between the second transmitter electrode and the plurality of second receiver electrodes when the second transmitter channel is activated.

3. The capacitive sensor array of claim 1, wherein the third transmitter electrode is adjacent to the plurality of first receiver electrodes.

4. The capacitive sensor array of claim 1, further comprising:
    a fourth transmitter electrode coupled to the second transmitter channel and disposed in the first row and a seventh column of the capacitive sensor array; and
    a plurality of fourth receiver electrodes disposed, adjacent the fourth transmitter electrode, in the first row and an eight column of the capacitive sensor array, wherein each of the fourth receiver electrodes is coupled to a respective one of a plurality of third receiver channels.

5. The capacitive sensor array of claim 4, wherein the plurality of third receiver electrodes are also adjacent to one of the second or fourth transmitter electrodes, and wherein none of the receiver electrodes coupled to the third receiver channels are adjacent to any transmitter electrodes coupled to the first transmitter channel.

6. The capacitive sensor array of claim 1, further comprising:
    a fourth transmitter electrode coupled to a third transmitter channel and disposed in a second row and the first column of the capacitive sensor array;
    a plurality of fourth receiver electrodes disposed, adjacent the fourth transmitter electrode, in the second row and the second column of the capacitive sensor array, wherein each of the fourth receiver electrodes is coupled to a respective one of the first receiver channels;
    a fifth transmitter electrode coupled to a fourth transmitter channel and disposed in the second row and the third column of the capacitive sensor array; and
    a plurality of fifth receiver electrodes disposed, adjacent the fourth transmitter electrode, in the second row and the fourth column of the capacitive sensor array, wherein each of the fifth receiver electrodes is coupled to a respective one of the first receiver channels.

7. The capacitive sensor array of claim 1, wherein a number of receiver channels coupled to the capacitive sensor array is based, at least in part, on a maximum number (m) of transmitter electrodes coupled to each transmitter channel and a number (n) of receiver electrodes disposed between each pair of transmitter electrodes in the capacitive sensor array.

8. The capacitive sensor array of claim 7, wherein the number of receiver channels is equal to $n+n*m$.

9. An input device, comprising:
    an array of sensor electrodes; and
    a processing system configured to:
        activate a first transmitter channel coupled to a first transmitter electrode and a third transmitter electrode, wherein the first transmitter electrode is disposed in a first row and a first column of the array and the third transmitter electrode is disposed in the first row and a fifth column of the array;
        sense a capacitive coupling between the first transmitter electrode and a plurality of first receiver electrodes adjacent the first transmitter electrode when the first transmitter channel is activated, wherein the first receiver electrodes are disposed in the first row and a second column of the array;
        sense a capacitive coupling between the third transmitter electrode and a plurality of third receiver electrodes adjacent the third transmitter electrode when the first transmitter channel is activated, wherein the third receiver electrodes are disposed in the first row and a sixth column of the array;
        activate a second transmitter channel coupled to a second transmitter electrode, wherein the second transmitter electrode is disposed in the first row and a third column of the array; and
        sense a capacitive coupling between the second transmitter electrode and a plurality of second receiver electrodes adjacent the second transmitter electrode when the second transmitter channel is activated, wherein the second receiver electrodes are disposed in the first row and a fourth column of the array.

10. The input device of claim 9, wherein the processing system is further configured to:
sense a capacitive coupling between the third transmitter electrode and the plurality of first receiver electrodes when the first transmitter channel is activated.

11. The input device of claim 9, wherein the array further comprises:
a fourth transmitter electrode coupled to the second transmitter channel and disposed in the first row and a seventh column of the array.

12. The input device of claim 11, wherein the processing system is further configured to:
sense a capacitive coupling between the fourth transmitter electrode and a plurality of fourth receiver electrodes adjacent the fourth transmitter electrode when the second transmitter channel is activated, wherein the fourth receiver electrodes are disposed in the first row and an eight column of the array.

13. The input device of claim 11, wherein, when the second transmitter channel is activated, no capacitive couplings are detected from the receiver electrodes adjacent to any transmitter electrodes coupled to the first transmitter channel.

14. The input device of claim 9, wherein the processing system is further configured to:
activate a third transmitter channel coupled to a fourth transmitter electrode, wherein the fourth transmitter electrode is disposed in a second row and the first column of the array;
sense a capacitive coupling between the fourth transmitter electrode and a plurality of fourth receiver electrodes adjacent the fourth transmitter electrode when the third transmitter channel is activated, wherein the fourth receiver electrodes are disposed in the second row and the second column of the array;
activate a fourth transmitter channel coupled to a fifth transmitter electrode, wherein the fifth transmitter electrode is disposed in the second row and the third column of the array; and
sense a capacitive coupling between the fifth transmitter electrode and a plurality of fifth receiver electrodes adjacent the fifth transmitter electrode when the fourth transmitter channel is activated, wherein the fifth receiver electrodes are disposed in the second row and a fourth column of the array.

15. A method of capacitive sensing, comprising:
activating a first transmitter channel coupled to a first transmitter electrode, wherein the first transmitter electrode is disposed in a first row and a first column of a capacitive sensor array;
sensing a capacitive coupling between the first transmitter electrode and a plurality of first receiver electrodes adjacent the first transmitter electrode when the first transmitter channel is activated, wherein the first receiver electrodes are disposed in the first row and a second column of the capacitive sensor array;
activating a second transmitter channel coupled to a second transmitter electrode, wherein the second transmitter electrode is disposed in the first row and a third column of the capacitive sensor array;
sensing a capacitive coupling between the second transmitter electrode and a plurality of second receiver electrodes adjacent the second transmitter electrode when the second transmitter channel is activated, wherein the second receiver electrodes are disposed in the first row and a fourth column of the capacitive sensor array; and
sensing a capacitive coupling between a third transmitter electrode and a plurality of third receiver electrodes adjacent the third transmitter electrode when the first transmitter channel is activated, wherein the third transmitter electrode is coupled to the first transmitter channel and disposed in the first row and a fifth column of the capacitive sensor array, and wherein the third receiver electrodes are disposed in the first row and a sixth column of the capacitive sensor array.

16. The method of claim 15, further comprising:
sensing a capacitive coupling between a fourth transmitter electrode and a plurality of fourth receiver electrodes adjacent the fourth transmitter electrode when the second transmitter channel is activated, wherein the fourth transmitter electrode is coupled to the second transmitter channel and disposed in the first row and a seventh column of the capacitive sensor array, and wherein the fourth receiver electrodes are disposed in the first row and an eight column of the capacitive sensor array.

17. The method of claim 15, further comprising:
activating a third transmitter channel coupled to a fourth transmitter electrode, wherein the fourth transmitter electrode is disposed in a second row and the first column of the capacitive sensor array;
sensing a capacitive coupling between the fourth transmitter electrode and a plurality of fourth receiver electrodes adjacent the fourth transmitter electrode when the third transmitter channel is activated, wherein the fourth receiver electrodes are disposed in the second row and the second column of the capacitive sensor array;
activating a fourth transmitter channel coupled to a fifth transmitter electrode, wherein the fifth transmitter electrode is disposed in the second row and the third column of the capacitive sensor array; and
sensing a capacitive coupling between the fifth transmitter electrode and a plurality of fifth receiver electrodes adjacent the fifth transmitter electrode when the fourth transmitter channel is activated, wherein the fifth receiver electrodes are disposed in the second row and the fourth column of the capacitive sensor array.

* * * * *